United States Patent
Sahoo

(10) Patent No.: US 12,493,904 B2
(45) Date of Patent: Dec. 9, 2025

(54) SYSTEMS AND METHODS FOR AUTOMATED CONFIGURATION TO ORDER AND QUOTE TO ORDER

(71) Applicant: Ingram Micro Inc., Irvine, CA (US)

(72) Inventor: Sanjib Sahoo, Naperville, IL (US)

(73) Assignee: Ingram Micro Inc., Irvine, CA (US)

( * ) Notice: Subject to any disclaimer, the term of this patent is extended or adjusted under 35 U.S.C. 154(b) by 0 days.

(21) Appl. No.: 18/583,337

(22) Filed: Feb. 21, 2024

(65) Prior Publication Data

US 2024/0428308 A1    Dec. 26, 2024

Related U.S. Application Data

(63) Continuation-in-part of application No. 18/349,836, filed on Jul. 10, 2023, and a continuation-in-part of application No. 18/341,714, filed on Jun. 26, 2023.

(Continued)

(51) Int. Cl.
G06Q 30/0601    (2023.01)
G06Q 10/087     (2023.01)
G06Q 30/0201    (2023.01)

(52) U.S. Cl.
CPC ....... *G06Q 30/0611* (2013.01); *G06Q 10/087* (2013.01); *G06Q 30/0206* (2013.01); *G06Q 30/0621* (2013.01)

(58) Field of Classification Search
CPC ............. G06Q 30/0611; G06Q 10/087; G06Q 30/0206; G06Q 30/0621
See application file for complete search history.

(56) References Cited

U.S. PATENT DOCUMENTS 5,237,495 A * 8/1993 Morii ....................... G07G 1/00
                                                                 705/28
5,515,269 A * 5/1996 Willis ................... G06Q 10/087
                                                                 705/29

(Continued)

FOREIGN PATENT DOCUMENTS

AU    2019101249 A4 * 11/2019   ........... H04L 9/3236
CN       108122157 A       6/2018

(Continued)

OTHER PUBLICATIONS

Zhamak Dehghani, "How to move beyond a monolithic data lake to a distributed data mesh", published by martinfowler.com on May 20, 2019 (Year: 2019).*

(Continued)

Primary Examiner — Omar Zeroual
(74) Attorney, Agent, or Firm — Ice Miller LLP

(57) ABSTRACT

Computerized systems and methods are disclosed for automating Configure to Order (CTO) and Quote to Order (QTO) processes. Methods include receiving user inputs for desired product configurations, retrieving corresponding data from a bill of materials database, and calculating optimized pricing through intelligent rules based on real-time market data. Automated quotes are generated and transferred to orders in a vendor system, selected based on pre-set criteria like vendor reputation and delivery time. Validation steps reduce errors, and real-time reports are generated. The system integrates a Real-Time Data Mesh for data aggregation, a Single Pane of Glass User Interface for user interactions, and Advanced Analytics and Machine Learning Modules for implementing rule-based and learning algorithms. The system is accessible across various devices and standardizes data for uniform consumption, while also employing machine learning models to continually optimize (Continued)

processes. Notifications are sent to users upon successful execution of orders or completion of quotes.

13 Claims, 11 Drawing Sheets

Related U.S. Application Data

(60) Provisional application No. 63/515,075, filed on Jul. 21, 2023, provisional application No. 63/515,076, filed on Jul. 21, 2023, provisional application No. 63/513,073, filed on Jul. 11, 2023, provisional application No. 63/513,078, filed on Jul. 11, 2023.

(56) References Cited

U.S. PATENT DOCUMENTS

| | | | |
|---|---|---|---|
| 5,870,717 A | 2/1999 | Wiecha | |
| 5,870,719 A * | 2/1999 | Maritzen | G06Q 30/02 705/26.1 |
| 6,167,383 A * | 12/2000 | Henson | G06Q 10/087 705/26.7 |
| 6,272,472 B1 | 8/2001 | Danneels | |
| 6,385,543 B1 | 5/2002 | Keiser | |
| 7,039,604 B1 * | 5/2006 | Srinivasan | G06Q 30/06 705/26.82 |
| 7,065,499 B1 * | 6/2006 | Seth | G06Q 30/0641 705/26.81 |
| 7,085,729 B1 * | 8/2006 | Kennedy | G06Q 10/06315 705/7.22 |
| 7,188,075 B1 * | 3/2007 | Smirnov | G06Q 30/06 705/7.35 |
| 7,302,405 B2 | 11/2007 | Hoskin | |
| 7,471,990 B2 * | 12/2008 | Hotta | G06Q 10/087 700/106 |
| 7,548,612 B2 | 6/2009 | Weissman | |
| 7,584,155 B1 * | 9/2009 | Carter, III | G06Q 30/02 705/400 |
| 7,698,170 B1 | 4/2010 | Darr et al. | |
| 7,720,720 B1 | 5/2010 | Sharma et al. | |
| 8,015,021 B2 | 9/2011 | Boyle | |
| 8,024,059 B2 * | 9/2011 | Kienzle | G06Q 10/0875 700/106 |
| 8,024,217 B2 * | 9/2011 | Sadre | G06Q 30/0283 705/7.29 |
| 8,301,522 B2 * | 10/2012 | Sun | G06Q 30/0283 705/26.1 |
| 8,386,296 B2 * | 2/2013 | Hage | G06Q 10/087 705/7.29 |
| 8,452,636 B1 | 5/2013 | Verastigui | |
| 8,781,882 B1 | 7/2014 | Arboletti et al. | |
| 9,958,291 B1 | 5/2018 | Shunturov et al. | |
| 10,134,003 B1 * | 11/2018 | Loyens | G06Q 10/087 |
| 10,410,125 B1 | 9/2019 | Finkelstein | |
| 10,417,728 B1 | 9/2019 | Yoggi | |
| 10,489,845 B2 | 11/2019 | Mullakkara | |
| 10,592,852 B1 * | 3/2020 | Karipides | G06Q 30/0202 |
| 10,664,799 B2 * | 5/2020 | O'Brien | H04L 9/3239 |
| 10,693,824 B2 | 6/2020 | Silva | |
| 10,718,632 B1 | 7/2020 | Platt et al. | |
| 10,757,154 B1 | 8/2020 | Jacobs | |
| 10,861,077 B1 * | 12/2020 | Liu | G06Q 30/06 |
| 11,062,319 B1 | 7/2021 | Hecht | |
| 11,074,643 B1 * | 7/2021 | Ellithorpe | G06Q 20/14 |
| 11,113,770 B1 * | 9/2021 | Magoon | G16H 10/60 |
| 11,151,608 B1 * | 10/2021 | Guo | G06Q 30/0277 |
| 11,163,846 B1 * | 11/2021 | Kadayam | G06F 16/954 |
| 11,205,147 B1 | 12/2021 | Anderson | |
| 11,282,145 B2 | 3/2022 | Ehrhart | |
| 11,386,456 B1 * | 7/2022 | Lightbody | G06Q 30/0256 |
| 11,556,864 B2 | 1/2023 | Yuan et al. | |
| 11,860,613 B2 * | 1/2024 | Maury | G06F 16/906 |
| 11,892,817 B2 * | 2/2024 | Jacobs | G06Q 50/04 |
| 11,977,964 B1 * | 5/2024 | Winstead | G06N 20/00 |
| 12,107,934 B1 | 10/2024 | Bailey | |
| 2001/0042036 A1 * | 11/2001 | Sanders | G06Q 40/04 705/36 R |
| 2002/0015480 A1 | 2/2002 | Daswani | |
| 2002/0023046 A1 | 2/2002 | Callahan | |
| 2002/0042755 A1 * | 4/2002 | Kumar | G06Q 10/087 705/26.4 |
| 2002/0062262 A1 | 5/2002 | Vasconi | |
| 2002/0091991 A1 | 7/2002 | Castro | |
| 2002/0120521 A1 * | 8/2002 | Forth | G06Q 30/0631 705/26.5 |
| 2002/0165747 A1 * | 11/2002 | Shriver | G06Q 10/06 705/301 |
| 2002/0188514 A1 * | 12/2002 | Kritt | G06Q 10/087 705/23 |
| 2003/0028451 A1 | 2/2003 | Ananian | |
| 2003/0055700 A1 * | 3/2003 | Hoffman | G06Q 10/06393 705/28 |
| 2003/0070061 A1 | 4/2003 | Wong | |
| 2003/0074248 A1 | 4/2003 | Braud | |
| 2003/0130863 A1 * | 7/2003 | Grey | H04L 67/02 705/1.1 |
| 2003/0144858 A1 * | 7/2003 | Jain | G06Q 10/0875 705/29 |
| 2003/0149608 A1 | 8/2003 | Kall | |
| 2003/0171962 A1 * | 9/2003 | Hirth | G06Q 10/087 705/7.25 |
| 2003/0216950 A1 * | 11/2003 | Chen | G06Q 10/087 705/26.81 |
| 2003/0229550 A1 * | 12/2003 | DiPrima | G06Q 10/087 705/28 |
| 2004/0006516 A1 * | 1/2004 | Anagol-Subbarao | G06Q 30/0633 705/26.8 |
| 2004/0019494 A1 * | 1/2004 | Ridgeway | G06Q 30/0601 705/26.1 |
| 2004/0044565 A1 | 3/2004 | Kumar | |
| 2004/0044582 A1 * | 3/2004 | Chowdhary | G06Q 30/0605 705/26.1 |
| 2004/0054800 A1 | 3/2004 | Shah et al. | |
| 2004/0102981 A1 | 5/2004 | Schuh | |
| 2004/0111304 A1 * | 6/2004 | Meka | G06Q 10/10 705/7.22 |
| 2004/0111327 A1 * | 6/2004 | Kidd | G06Q 10/087 705/26.5 |
| 2004/0267674 A1 | 12/2004 | Feng et al. | |
| 2005/0049938 A1 | 3/2005 | Venkiteswaran | |
| 2005/0144082 A1 | 6/2005 | Coolman | |
| 2005/0262196 A1 * | 11/2005 | Mueller | G06Q 30/0621 709/219 |
| 2006/0178918 A1 * | 8/2006 | Mikurak | G06Q 10/06 705/7.31 |
| 2006/0277086 A1 * | 12/2006 | Ball | G06Q 10/087 705/7.25 |
| 2006/0287932 A1 | 12/2006 | Wulteputte et al. | |
| 2007/0033569 A1 | 2/2007 | Davidson | |
| 2007/0050229 A1 | 3/2007 | Tatro et al. | |
| 2007/0233574 A1 * | 10/2007 | Koegler | G06Q 10/10 705/26.81 |
| 2008/0052205 A1 * | 2/2008 | Dolley | G06Q 10/06 705/28 |
| 2008/0133569 A1 | 6/2008 | Vu et al. | |
| 2008/0228657 A1 * | 9/2008 | Nabors | G06Q 50/188 705/80 |
| 2008/0270256 A1 * | 10/2008 | Caballero | G06Q 40/12 705/26.81 |
| 2008/0319849 A1 | 12/2008 | Rapoport | |
| 2009/0063305 A1 * | 3/2009 | Kreifels | G06Q 10/087 705/28 |
| 2009/0063309 A1 * | 3/2009 | Stephens | G06Q 10/06 705/29 |
| 2009/0112727 A1 | 4/2009 | Chi | |
| 2009/0171816 A1 * | 7/2009 | del Rosario | G06Q 10/0875 705/28 |
| 2009/0177714 A1 | 7/2009 | Obermeyer et al. | |

(56) References Cited

U.S. PATENT DOCUMENTS

| | | | |
|---|---|---|---|
| 2010/0161364 A1* | 6/2010 | Lokowandt | G06Q 10/087 705/28 |
| 2011/0029345 A1* | 2/2011 | Kienzle | G06Q 10/06 700/107 |
| 2011/0238484 A1* | 9/2011 | Toumayan | G06Q 30/0641 709/225 |
| 2012/0036089 A1 | 2/2012 | Washington et al. | |
| 2012/0071999 A1 | 3/2012 | Trammell et al. | |
| 2012/0084215 A1 | 4/2012 | Trier | |
| 2012/0209824 A1* | 8/2012 | Morimoto | G06F 16/958 707/705 |
| 2012/0226612 A1 | 9/2012 | Kurtis et al. | |
| 2012/0259675 A1* | 10/2012 | Roehrs | G06Q 30/02 705/7.29 |
| 2012/0316935 A1 | 12/2012 | Feuerstin | |
| 2012/0323933 A1 | 12/2012 | He | |
| 2013/0013346 A1* | 1/2013 | O'Connor | G06Q 40/08 705/4 |
| 2013/0041781 A1 | 2/2013 | Freydberg | |
| 2013/0091033 A1* | 4/2013 | Goodman | G06Q 30/0621 705/26.5 |
| 2013/0311271 A1* | 11/2013 | Agrawal | G06Q 30/02 705/14.71 |
| 2014/0025529 A1* | 1/2014 | Honeycutt | G06Q 30/0621 705/26.5 |
| 2014/0052840 A1 | 2/2014 | Shukla | |
| 2014/0095265 A1* | 4/2014 | Steinman | G06Q 10/0637 705/7.36 |
| 2014/0095343 A1* | 4/2014 | Daniel | G06F 16/00 705/26.5 |
| 2014/0122377 A1* | 5/2014 | Goodman | G06Q 10/06311 706/11 |
| 2014/0200965 A1* | 7/2014 | McConnell | G06Q 30/0206 705/7.35 |
| 2014/0222453 A1 | 8/2014 | Wills et al. | |
| 2014/0222641 A1 | 8/2014 | Kober | |
| 2014/0279254 A1 | 9/2014 | Hastman | |
| 2014/0322678 A1 | 10/2014 | Briancon et al. | |
| 2014/0324549 A1 | 10/2014 | Chelap et al. | |
| 2014/0358723 A1 | 12/2014 | Ballaro et al. | |
| 2015/0189014 A1 | 7/2015 | Grunenberger | |
| 2015/0281148 A1 | 10/2015 | Masterson et al. | |
| 2015/0286645 A1 | 10/2015 | Sinha | |
| 2016/0092474 A1 | 3/2016 | Stojanovic | |
| 2016/0203319 A1 | 7/2016 | Coen et al. | |
| 2016/0232624 A1 | 8/2016 | Goldberg et al. | |
| 2016/0300144 A1* | 10/2016 | Santhanam | G06N 20/00 |
| 2016/0335345 A1 | 11/2016 | Wang | |
| 2017/0006135 A1 | 1/2017 | Siebel | |
| 2017/0053558 A1* | 2/2017 | Zhou | G09B 19/0092 |
| 2017/0060641 A1 | 3/2017 | Ramaswamy | |
| 2017/0091327 A1 | 3/2017 | Bostic | |
| 2017/0134516 A1 | 5/2017 | Gutman | |
| 2017/0193527 A1* | 7/2017 | Backer | G06Q 30/0201 |
| 2017/0255903 A1* | 9/2017 | Chowdhry | G06Q 10/0833 |
| 2017/0255987 A1* | 9/2017 | Bacharach | G06Q 30/0631 |
| 2017/0278173 A1* | 9/2017 | Ettl | G06Q 30/0631 |
| 2017/0286909 A1* | 10/2017 | Baynes | G06Q 10/067 |
| 2017/0287038 A1 | 10/2017 | Krasadakis | |
| 2017/0364534 A1* | 12/2017 | Zhang | G06F 16/284 |
| 2017/0364796 A1 | 12/2017 | Wiebe | |
| 2018/0005296 A1 | 1/2018 | Eades et al. | |
| 2018/0136992 A1 | 5/2018 | Siebel | |
| 2018/0143975 A1 | 5/2018 | Casal | |
| 2018/0285790 A1* | 10/2018 | Huynh | G06Q 30/0206 |
| 2018/0332102 A1* | 11/2018 | Sheidaei | G06Q 10/20 |
| 2018/0343491 A1 | 11/2018 | Loheide et al. | |
| 2019/0095992 A1 | 3/2019 | Soh | |
| 2019/0102162 A1 | 4/2019 | Pitre et al. | |
| 2019/0102753 A1 | 4/2019 | Harrison | |
| 2019/0114689 A1* | 4/2019 | Wang | G06Q 30/0631 |
| 2019/0147400 A1 | 5/2019 | Knight | |
| 2019/0149725 A1 | 5/2019 | Adato et al. | |
| 2019/0215424 A1 | 7/2019 | Adato et al. | |
| 2019/0220914 A1 | 7/2019 | Flannery et al. | |
| 2019/0243836 A1 | 8/2019 | Nanda et al. | |
| 2019/0251457 A1 | 8/2019 | Byrnes et al. | |
| 2019/0286759 A1* | 9/2019 | Wilkins | G06N 3/042 |
| 2020/0134683 A1* | 4/2020 | Boren | G06F 16/904 |
| 2020/0210947 A1* | 7/2020 | Devarakonda | G06Q 10/06312 |
| 2020/0219159 A1* | 7/2020 | Choudhary | G06F 3/0484 |
| 2020/0235941 A1 | 7/2020 | Nguyen | |
| 2020/0265512 A1* | 8/2020 | James | G06Q 40/03 |
| 2020/0279200 A1* | 9/2020 | Makhija | G06N 3/049 |
| 2020/0320095 A1 | 10/2020 | Haase | |
| 2020/0327252 A1 | 10/2020 | Mcfall | |
| 2020/0334608 A1 | 10/2020 | Ramanathan et al. | |
| 2020/0349624 A1* | 11/2020 | Ramanathan | G06Q 10/087 |
| 2020/0394398 A1* | 12/2020 | Pamarthi | G06F 16/345 |
| 2020/0394455 A1 | 12/2020 | Lee | |
| 2021/0012329 A1* | 1/2021 | Gandhi | G06Q 20/027 |
| 2021/0012358 A1 | 1/2021 | Wical | |
| 2021/0065294 A1 | 3/2021 | Trevathan | |
| 2021/0125144 A1* | 4/2021 | Liu | G06Q 50/04 |
| 2021/0133850 A1* | 5/2021 | Ayush | G06V 10/945 |
| 2021/0144250 A1 | 5/2021 | Mahar | |
| 2021/0158259 A1* | 5/2021 | Evans | G06Q 10/04 |
| 2021/0166251 A1 | 6/2021 | Mehmanpazir et al. | |
| 2021/0182746 A1 | 6/2021 | Muthukrishnan | |
| 2021/0226573 A1 | 7/2021 | George | |
| 2021/0233129 A1* | 7/2021 | Bikumala | G06Q 10/0875 |
| 2021/0241299 A1 | 8/2021 | Ramini | |
| 2021/0241301 A1* | 8/2021 | Christensen | G06Q 30/0603 |
| 2021/0241337 A1* | 8/2021 | Bikumala | G06N 20/00 |
| 2021/0248151 A1 | 8/2021 | Kadel | |
| 2021/0269244 A1 | 9/2021 | Ahmann | |
| 2021/0334871 A1 | 10/2021 | Quinn et al. | |
| 2021/0350429 A1 | 11/2021 | Gangadarappa | |
| 2021/0357959 A1 | 11/2021 | Cella et al. | |
| 2021/0378779 A1* | 12/2021 | Lenzenhuber | A61B 17/1615 |
| 2022/0058723 A1 | 2/2022 | Swett et al. | |
| 2022/0067085 A1 | 3/2022 | Nihas | |
| 2022/0114509 A1 | 4/2022 | Pinheiro | |
| 2022/0122134 A1 | 4/2022 | Hoffman et al. | |
| 2022/0129803 A1* | 4/2022 | Bikumala | G06F 16/906 |
| 2022/0197246 A1 | 6/2022 | Cella | |
| 2022/0245008 A1 | 8/2022 | Deljavan Farshi | |
| 2022/0245727 A1 | 8/2022 | Roll et al. | |
| 2022/0253775 A1 | 8/2022 | Burkhead et al. | |
| 2022/0284459 A1 | 9/2022 | Kwok et al. | |
| 2022/0292160 A1 | 9/2022 | Mehta et al. | |
| 2022/0357971 A1 | 11/2022 | Feliciano | |
| 2022/0383400 A1 | 12/2022 | Wade | |
| 2022/0405775 A1* | 12/2022 | Siebel | G06Q 30/0202 |
| 2023/0005330 A1 | 1/2023 | Hartwig et al. | |
| 2023/0059565 A1 | 2/2023 | Ravindran et al. | |
| 2023/0064747 A1* | 3/2023 | Inoue Sardenberg | G06Q 30/0206 |
| 2023/0075794 A1* | 3/2023 | Muttreja | H04L 67/51 |
| 2023/0091441 A1 | 3/2023 | Go | |
| 2023/0102048 A1* | 3/2023 | Cella | B25J 9/1661 700/248 |
| 2023/0162258 A1* | 5/2023 | Das Gupta | G06Q 30/0633 705/26.7 |
| 2023/0185878 A1 | 6/2023 | Makhija et al. | |
| 2023/0206251 A1 | 6/2023 | Acharya et al. | |
| 2023/0222536 A1 | 7/2023 | Hoang | |
| 2023/0316377 A1* | 10/2023 | Bacharach | G06Q 30/0631 705/26.7 |
| 2023/0350963 A1* | 11/2023 | Saad | G06F 16/9038 |
| 2023/0359161 A1 | 11/2023 | O'Rourke et al. | |
| 2023/0367696 A1 | 11/2023 | Liu | |
| 2023/0394426 A1* | 12/2023 | Bauders | G06Q 10/087 |
| 2023/0418980 A1 | 12/2023 | Abrougui | |
| 2023/0419387 A1 | 12/2023 | Ballaro | |
| 2024/0070750 A1* | 2/2024 | Smith, Jr. | G06Q 30/0631 |
| 2024/0095789 A1* | 3/2024 | Vaishnav | G06Q 30/0283 |
| 2024/0144170 A1 | 5/2024 | Kim | |
| 2024/0184650 A1 | 6/2024 | O'Kelley | |
| 2024/0248919 A1 | 7/2024 | Kumar | |
| 2024/0266010 A1 | 8/2024 | Adhikari et al. | |
| 2024/0281423 A1 | 8/2024 | Perrin | |
| 2024/0311853 A1 | 9/2024 | Rendahl et al. | |

(56) References Cited

U.S. PATENT DOCUMENTS

| | | |
|---|---|---|
| 2024/0354867 A1 | 10/2024 | Young et al. |
| 2024/0370902 A1 | 11/2024 | Miglani |
| 2024/0427789 A1 | 12/2024 | Sahoo |
| 2024/0428166 A1 | 12/2024 | Sahoo et al. |
| 2025/0005479 A1 | 1/2025 | Sahoo |
| 2025/0036648 A1 | 1/2025 | Hunter et al. |
| 2025/0062949 A1 | 2/2025 | Nimmagadda et al. |

FOREIGN PATENT DOCUMENTS

| | | | | |
|---|---|---|---|---|
| JP | 2001005863 A | 1/2001 | | |
| JP | 2004538542 A | 12/2004 | | |
| JP | 2020514860 A | 5/2020 | | |
| JP | 2020514860 A5 | 2/2021 | | |
| JP | 2021532444 A | 11/2021 | | |
| JP | 2022175317 A | 11/2022 | | |
| JP | 2023508188 A | 3/2023 | | |
| KR | 20070057806 A | 6/2007 | | |
| WO | 200233581 A2 | 4/2002 | | |
| WO | 2002063530 A2 | 8/2002 | | |
| WO | WO-2004104739 A2 * | 12/2004 | ............ | G06Q 10/06 |
| WO | 2006026673 A1 | 3/2006 | | |
| WO | WO-2010107730 A1 * | 9/2010 | ............ | G06Q 30/06 |
| WO | 2018116252 A1 | 6/2018 | | |
| WO | WO-2018231850 A1 * | 12/2018 | ............ | H04W 4/38 |
| WO | 2022132040 A1 | 6/2022 | | |
| WO | 2024233674 A2 | 11/2024 | | |

OTHER PUBLICATIONS

European Search Report issued in EP 24186933, Dated Nov. 25, 2024, 9 pgs.
European Search Report issued in EP 24184819.1, Dated Dec. 2, 2024, 10 pgs.
Anonymous, "Data Mesh," May 25, 2023, XP093199672, wikipedia.org, URL: https://en.wikipedia.org/w/index.php?title=Data_mesh&oldid=1157039904.
Machado Ines Araujo et al., "Data Mesh: Concepts and Principles of a Pardigm Shift in Data Architectures," Procedia Computer Science, vol. 196, Jan. 10, 2022, pp. 263-271, XP093050267, Amsterdam, NL, ISSN: 1877-0509, DOI: 10.1016/j.procs.2021.12.013, URL: https://www.sciencedirect.com/science/article/pii/S1877050921022365.
Office Action issued in Japanese Patent Application No. 2024-108629, dated Oct. 29, 2024, 5 pgs.
English Translation of Office Action issued in Japanese Patent Application No. 2024-108629, dated Oct. 29, 2024, 6 pgs.
Kotaro Suzumura, Latest IT Trends by Field: Inter-System Integration: The Key Lies in the Use of Open Technology, Performance and Reliability, Nikkei Computer, Japan, Nikkei BP, Sep. 23, 2002, No. 557, pp. 28-29, ISSN 0285-4619.
Biswas et al. "A Proposed Artchitecture for Big Data Driven Supply Chain Analytics." ICFAI University Press (IUP) Journal of Supply Chain Management, vol. XIII, No. 3 (2016), pp. 7-34, https://arxiv.org/abs/1705.04958.
Extended European Search Report for European Application No. 24187943.6, dated Nov. 19, 2024, 8 Pages.
Extended European Search Report for European Application No. 24187967.5, dated Nov. 25, 2024, 8 Pages.
Office Action for Japanese Application No. 2024-101794, dated Sep. 13, 2024, 21 Pages.
Office Action for Japanese Application No. 2024-112073, dated Oct. 15, 2024, 9 Pages.
Agarwal, Saloni et al., "Improving Bundles Recommendation Coverage in Sparse Product Graphs," WWWWW 22 Companion, 2022, all pgs.
Carlos, Rafael et al., "Framework for Continuous Agile Technology Roadmap Updating," Emeraldinsight.com, 2017, all pages.
Decision of Refusal issued in Japanese Patent Application No. 2024-108629, dated Apr. 11, 2025, 5 pgs.
English Translation of Decision of Refusal issued in Japanese Patent Application No. 2024-108629, dated Apr. 11, 2025, 7 pgs.
Office Action issued in Japanese Patent Application No. 2024-101794, dated May 16, 2025, 6 pgs.
English Translation of Office Action issued in Japanese Patent Application No. 2024-101794, dated May 16, 2025, 5 pgs.
European Search Report issued in European Patent Application No. 25163362.4 , dated May 2, 2025, 10 pgs.
European Search Report issued in European Patent Application No. EP25156175.9, dated Mar. 13, 2025.
Examination Report issued in Australian Patent Application No. 2024204660, dated Apr. 16, 2025, 4 pgs.
Examination Report issued in Australian Patent Application No. 20244204340, dated Feb. 28, 2025, 5 pgs.
Examination Report issued in Australian Patent Application No. 2025200528, dated Mar. 6, 2025, 5 pgs.
Examination Report issued in Australian Patent Application No. 2025200535, dated Apr. 7, 2025, 7 pgs.
Examination Report issued in Australian Patent Application No. 2025200793, dated Apr. 1, 2025, 9 pgs.
Examination Report issued in Australian Patent Application No. 2025201639, dated Apr. 30, 2025, 6 pgs.
Examination Report issued in Australian Patent Application No. 2025201740, dated Mar. 18, 2025, 5 pgs.
Kohut, Yurii et al., "Recommendation System for Purchasing Goods based on the Decision Tree Algorithm," Advances in Cyber-Physical Systems, vol. 6, No. 2, 2021, 7 pgs.
Palo, Joonas, "Product Roadmapping Tool and Process Unification as part of a Global End-to-End Repeatability Operating Model Development," Haaga-helia, 2023, all pgs.
Sutton, Rowan et al., "A Reinforcement Learning and Synthetic Data Approach to Mobile Notification Management," ACM, 2019, all pgs.
Sun, Zhu et al., "Revisiting Bundle Recommendation: Datasets, Tasks, Challenges and Opportunities for Intent Aware Product Bundling," Association for Computing Machinery, Spain, SIGIR 2022, 12 pgs.
BasuMallic, "What is a Software Engine? Types, Applications, and Importance." Oct. 7, 2022. URL Link: <https://www.spiceworks.com/tech/devops/articles/what-is-software-engine/>.
Holzer et al., "Developing a Framework for Linking Design Intelligence from Multiple Professions in the AEC Industry," 2007. URL Link: <https://link.springer.com/content/pdf/10.1007/978-1-4020-6528-6_23.pdf>.
PCMag. "engine" definition. Dec. 1, 2020 snapshot via Archive.org URL Link: <https://www.pcemag.com/encyclopedia/term/engine>.
Techopedia. "Engine" definition. Oct. 19, 2012. URL Link: <https://www.techopedia.com/definition/24155/engine>.
Search Report from European Patent Application No. 25154230.4, dated Jul. 10, 2025, 10 pgs.

* cited by examiner

SYSTEMS AND METHODS FOR AUTOMATED CONFIGURATION TO ORDER AND QUOTE TO ORDER

CROSS REFERENCE TO RELATED APPLICATIONS

This application is a Continuation-In-Part (CIP) of U.S. patent application Ser. No. 18/341,714, filed on Jun. 26, 2023 and U.S. patent application Ser. No. 18/349,836, filed on Jul. 10, 2023. This application also claims the benefit of U.S. provisional application No. 63/513,073, filed on Jul. 11, 2023; U.S. provisional application No. 63/513,078, filed on Jul. 11, 2023; U.S. provisional application No. 63/515,075, filed on Jul. 21, 2023; and U.S. provisional application No. 63/515,076, filed on Jul. 21, 2023. Each of these applications is incorporated herein by reference in its entirety.

BACKGROUND

Traditional ordering processes in distribution and supply-chain platforms are marred with inefficiencies, delays, and inaccuracies. In the conventional landscape, multiple systems and vendors usually perform each activity independently, from creating a bill of materials to registering deals, applying pricing, generating quotes, and submitting orders. This approach leads to inefficiencies and a heightened likelihood of errors.

Enterprise Resource Planning (ERP) systems have served as the mainstay in managing business processes, including distribution and supply chain. These systems act as central repositories where different departments such as finance, human resources, and inventory management can access and share real-time data. While ERPs are comprehensive, they present several challenges in today's complex distribution and supply chain environment. One of the primary challenges is data fragmentation. Data silos across different departments or even separate ERP systems make real-time visibility difficult to achieve. Users lack a comprehensive view of key distribution and supply chain metrics, which adversely affects decision-making processes.

Moreover, ERP systems often do not offer effective data integration capabilities. Traditional ERP systems are not designed to integrate efficiently with external systems or even between different modules within the same ERP suite. This design results in a cumbersome and error-prone manual process to transfer data between systems and affects the flow of information throughout the supply chain. Data inconsistencies occur when information exists in different formats across systems, hindering accurate data analysis and leading to uninformed decision-making.

Data inconsistency presents another challenge. When data exists in different formats or units across departments or ERPs, standardizing this data for meaningful analysis becomes a painstaking process. Businesses often resort to time-consuming manual processes for data transformation and validation, which further delays decision-making. Additionally, traditional ERP systems often lack the capabilities to handle large volumes of data effectively. These systems struggle to provide timely insights for operational improvements, particularly problematic for businesses dealing with complex and expansive distribution and supply chain networks.

Data security is another concern, especially considering the sensitive nature of supply chain data, which includes customer details, pricing, and contracts. Ensuring compliance with global regulations on data security and governance adds an additional layer of complexity. Traditional ERP systems often lack robust security features agile enough to adapt to the continually evolving landscape of cybersecurity threats and compliance requirements.

Lastly, the consumer expectation for faster service and real-time information adds further pressure on traditional systems. In the age of digital transformation and e-commerce, customers expect immediate quotes and quick order fulfillment. The traditional process often takes between six to 72 hours, a timeframe not competitive in today's fast-paced market.

The shortcomings of existing technology not only cause operational inefficiencies but also result in poor customer experiences. For instance, delays in quote generation or order processing can result in lost sales opportunities. Furthermore, inaccuracies in pricing or inventory levels can lead to customer dissatisfaction and potential loss of business. Conventional systems and methods lack an integrated, efficient, and responsive approach to ordering processes.

BRIEF SUMMARY OF THE INVENTION

Automated Configure to Order (CTO) and Quote to Order (QTO) processes aim to address above-mentioned deficiencies in the distribution industry by providing a unified platform experience. This platform integrates various activities and systems into a single interface and enables users to streamline the entire process. It reduces the time required for activities like bill of materials creation, deal registration, pricing application, quote creation, and order placement. Therefore, a technology solution that can effectively integrate, streamline, and accelerate these complex processes while also ensuring data security and compliance is critically needed.

In the global distribution industry, challenges such as inefficient distribution management, SKU management, and the transition to direct-to-consumer models necessitate innovative solutions. Traditional distribution methods are increasingly insufficient, particularly with shifts in consumer expectations and regulations. The invention addresses these challenges by integrating a comprehensive set of functionalities focused on distribution management, supply chain management, and customer visibility into one platform.

According to some embodiments, a CTO Module and a QTO Module can be integrated with a Real-Time Data Mesh (RTDM) and a Single Pane of Glass User Interface (SPoG UI). The CTO Module uses algorithms to optimize user choices based on real-time inventory and customization options. It also employs a recursive algorithm to create a bill of materials. The QTO Module verifies user permissions and calculates applicable discounts. Both modules employ validation algorithms to check for errors and inconsistencies.

In a non-limiting example, a Configuration Builder within the CTO Module employs a decision tree algorithm using entropy minimization techniques to offer compatible choices to users. An alternative embodiment employs machine learning models like neural networks for more tailored choices. The Pricing Engine uses a multi-variable linear regression model to predict costs, with an alternative embodiment using more advanced machine learning models like Random Forest.

In an embodiment, a CTO Module interacts with the RTDM and SPoG UI 705. Upon receiving a user request, a Configuration Builder can fetch real-time inventory from RTDM. The module can utilize a decision tree algorithm with entropy minimization for choice optimization. Alternatively, machine learning models like neural networks can refine user choices. A Bill of Materials (BOM) Generator can use a recursive algorithm to list components in a hierarchical structure. In some embodiments, a Depth-First Search (DFS) algorithm can traverse this structure to create a complete BOM. A Pricing Engine can perform cost prediction. In a non-limiting example, the Pricing Engine can employ a multi-variable linear regression model for cost prediction. Variables can include base price, volume discounts, and special conditions. An alternative option can implement a Random Forest algorithm for more complex variable relationships. An Error-Check Integrator can apply validation algorithms, ranging from basic boundary checks to advanced anomaly detection. In some embodiments, Support vector machines (SVM) can classify configurations as valid or invalid based on historical data.

In some embodiments, a QTO Module can initiate a QTO request via the SPoG UI. An Authorization Checker can verify user permissions against role-based access control policies in AAML 715. A Pricing Aggregator can query the RTDM for current pricing data. A Discount Calculator can apply discounts. In a non-limiting example, the Discount Calculator can apply discounts using a weighted scoring algorithm. In some embodiments, a Quote Template Filler can populate a quote template using a string replacement algorithm based on a KMP algorithm. An Error-Check Integrator can review the quote for errors using predefined rules in AAML.

Additionally or alternatively, Error-Check Integrators in both modules can use sets of validation algorithms. These could be support vector machines trained on historical data. Real-time data can be fetched from CRM systems via the RTDM, and/or through additional or alternative processes, such as via OAuth 2.0 secure API calls, ensuring synchronization. SQL queries pull account-specific data, such as customization restrictions or previously negotiated pricing conditions, directly from the CRM database via RTDM.

Embodiments disclosed herein integrate multiple systems, automates processes, and validates data configurations based on intelligent rules. It enables efficient execution of complex tasks without specialized knowledge, reducing time and minimizing errors. Moreover, the invention is adaptable and configurable to meet evolving market and customer demands, thereby maintaining the relevance and sustainability of the distribution model. The invention thus provides an efficient, integrated, and adaptable solution for automating CTO and QTO processes in the distribution industry.

Single Pane of Glass

The Single Pane of Glass (SPoG) can provide a comprehensive solution that is configured to address these multi-faceted challenges. It can be configured to provide a holistic, user-friendly, and efficient platform that streamlines the distribution process.

According to some embodiments, SPoG can be configured to address supply chain and distribution management by enhancing visibility and control over the supply chain process. Through real-time tracking and analytics, SPoG can deliver valuable insights into inventory levels and the status of goods, ensuring that the process of supply chain and distribution management is handled efficiently.

According to some embodiments, SPoG can integrate multiple touchpoints into a single platform to emulate a direct consumer channel into a distribution platform. This integration provides a unified direct channel for consumers to interact with distributors, significantly reducing the complexity of the supply chain and enhancing the overall customer experience.

SPoG offers an innovative solution for improved inventory management through advanced forecasting capabilities. These predictive analytics can highlight demand trends, guiding companies in managing their inventory more effectively and mitigating the risks of stockouts or overstocks.

According to some embodiments, SPoG can include a global compliance database. Updated in real-time, this database enables distributors to stay abreast with the latest international laws and regulations. This feature significantly reduces the burden of manual tracking, ensuring smooth and compliant cross-border transactions.

According to some embodiments, to streamline SKU management and product localization, SPoG integrates data from various OEMs into a single platform. This not only ensures data consistency but also significantly reduces the potential for errors. Furthermore, it provides capabilities to manage and distribute localized SKUs efficiently, thereby aligning with specific market needs and requirements.

According to some embodiments, SPoG is its highly configurable and user-friendly platform. Its intuitive interface allows users to easily access and purchase technology, thereby aligning with the expectations of the new generation of tech buyers.

Moreover, SPoG's advanced analytics capabilities offer invaluable insights that can drive strategy and decision-making. It can track and analyze trends in real-time, allowing companies to stay ahead of the curve and adapt to changing market conditions.

SPoG's flexibility and scalability make it a future-proof solution. It can adapt to changing business needs, allowing companies to expand or contract their operations as needed without significant infrastructural changes.

SPoG's innovative approach to resolving the challenges in the distribution industry makes it an invaluable tool. By enhancing supply chain visibility, streamlining inventory management, ensuring compliance, simplifying SKU management, and delivering a superior customer experience, it offers a comprehensive solution to the complex problems that have long plagued the distribution sector. Through its implementation, distributors can look forward to increased efficiency, reduced errors, and improved customer satisfaction, leading to sustained growth in the ever-evolving global market.

Real-Time Data Mesh (RTDM)

The platform can be include implementation(s) of a Real-Time Data Mesh (RTDM), according to some embodiments. RTDS offers an innovative solution to address these challenges. RTDM, a distributed data architecture, enables real-time data availability across multiple sources and touchpoints. This feature enhances supply chain visibility, allowing for efficient management and enabling distributors to handle disruptions more effectively.

RTDM's predictive analytics capability offers a solution for efficient inventory control. By providing insights into demand trends, it aids companies in managing inventory, reducing risks of overstocking or stockouts.

RTDM's global compliance database, updated in real-time, ensures distributors are current with international regulations. It significantly reduces the manual tracking burden, enabling cross-border transactions.

The RTDM also simplifies SKU management and localization by integrating data from various OEMs, ensuring data consistency and reducing error potential. Its capabilities for managing and distributing localized SKUs align with specific market needs efficiently.

The RTDM enhances customer experience with its intuitive interface, allowing easy access and purchase of technology, meeting the expectations of the new generation of tech buyers.

Advantages of SPoG and RTDM Integration

Integrating SPoG platform with the RTDM provides a myriad of advantages. Firstly, it offers a holistic solution to the longstanding problems in the distribution industry. With the RTDM's capabilities, SPoG can enhance supply chain visibility, streamline inventory management, ensure compliance, simplify SKU management, and deliver a superior customer experience.

The real-time tracking and analytics offered by RTDM improve SPoG's ability to manage the supply chain and inventory effectively. It provides accurate and current information, enabling distributors to make informed decisions quickly.

Integrating SPoG with RTDM also ensures data consistency and reduces errors in SKU management. By providing a centralized platform for managing data from various OEMs, it simplifies product localization and helps to align with market needs.

The global compliance database of RTDM, integrated with SPoG, facilitates and compliant cross-border transactions. It also reduces the burden of manual tracking, saving significant time and resources.

In some embodiments, a distribution platform incorporates SPoG and RTDM to provide an improved and comprehensive distribution system. The platform can leverage the advantages of a distribution model, addresses its existing challenges, and positions it for sustained growth in the ever-evolving global market.

BRIEF DESCRIPTION OF THE DRAWINGS/FIGURES

DETAILED DESCRIPTION OF THE INVENTION

Embodiments may be implemented in hardware, firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices, and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

It should be understood that the operations shown in the exemplary methods are not exhaustive and that other operations can be performed as well before, after, or between any of the illustrated operations. In some embodiments of the present disclosure, the operations can be performed in a different order and/or vary.

Figure 1:
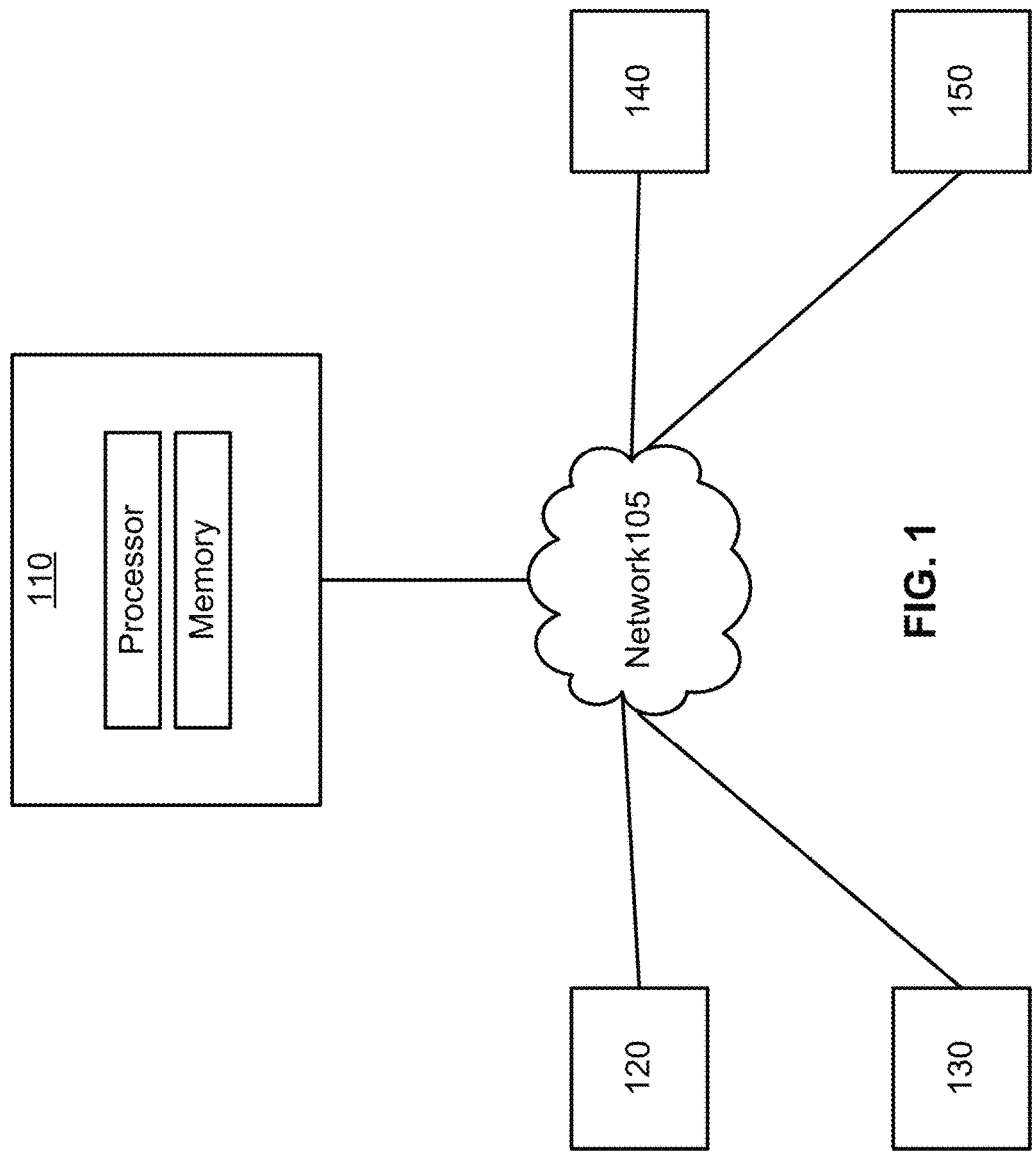
FIG. 1 illustrates one embodiment of an operating environment of a distribution platform, referred to as System in this embodiment.

FIG. 1 illustrates an operating environment 100 of a distribution platform, referred to as System 110 in this embodiment. System 110 operates within the context of an information technology (IT) distribution model, catering to various users such as customers 120, end customers 130, vendors 140, resellers 150, and other entities involved in the distribution process. This operating environment encompasses a broad range of characteristics and dynamics that contribute to the success and efficiency of the distribution platform.

Customers 120 within the operating environment of System 110 represent businesses or individuals seeking IT solutions to meet their specific needs. These customers may require a diverse range of IT products such as hardware components, software applications, networking equipment, or cloud-based services. System 110 provides customers with a user-friendly interface, allowing them to browse, search, and select the most suitable IT solutions based on their requirements. Customers can also access real-time data and analytics through System 110, empowering them to make informed decisions and optimize their IT infrastructure.

End customers 130 can be the ultimate beneficiaries of the IT solutions provided by System 110. They may include businesses or individuals who utilize IT products and services to enhance their operations, productivity, or daily activities. End customers rely on System 110 to access a wide array of IT solutions, ensuring they have access to the latest technologies and innovations in the market. System 110 enables end customers to track their orders, receive updates on delivery status, and access customer support services, thereby enhancing their overall experience.

Vendors 140 play a crucial role within the operating environment of System 110. These vendors encompass manufacturers, distributors, and suppliers who offer a diverse range of IT products and services. System 110 acts as a centralized platform for vendors to showcase their offerings, manage inventory, and facilitate transactions with customers and resellers. Vendors can leverage System 110 to streamline their supply chain operations, manage pricing and promotions, and gain insights into customer preferences and market trends. By integrating with System 110, vendors can expand their reach, access new markets, and enhance their overall visibility and competitiveness.

Resellers 150 can be intermediaries within the distribution model who bridge the gap between vendors and customers. They play a vital role in the IT distribution ecosystem by connecting customers with the right IT solutions from various vendors. Resellers may include retailers, value-added resellers (VARs), system integrators, or managed service providers. System 110 enables resellers to access a comprehensive catalog of IT solutions, manage their sales pipeline, and provide value-added services to customers. By leveraging System 110, resellers can enhance their customer relationships, optimize their product offerings, and increase their revenue streams.

Within the operating environment of System 110, there can be various dynamics and characteristics that contribute to its effectiveness. These dynamics include real-time data exchange, integration with existing enterprise systems, scalability, and flexibility. System 110 ensures that relevant data can be exchanged in real-time between users, enabling accurate decision-making and timely actions. Integration with existing enterprise systems such as enterprise resource planning (ERP) systems, customer relationship management (CRM) systems, and warehouse management systems allows for communication and interoperability, eliminating data silos and enabling end-to-end visibility.

System 110 can achieve scalability and flexibility. It can accommodate the growing demands of the IT distribution model, whether it involves an expanding customer base, an increasing number of vendors, or a wider range of IT products and services. System 110 can be configured to handle large-scale data processing, storage, and analysis, ensuring that it can support the evolving needs of the distribution platform. Additionally, System 110 leverages a technology stack that includes .NET, Java, and other suitable technologies, providing a robust foundation for its operations.

In summary, the operating environment of System 110 within the IT distribution model encompasses customers 120, end customers 130, vendors 140, resellers 150, and other entities involved in the distribution process. System 110 serves as a centralized platform that facilitates efficient collaboration, communication, and transactional processes between these users. By leveraging real-time data exchange, integration, scalability, and flexibility, System 110 empowers users to optimize their operations, enhance customer experiences, and drive business success within the IT distribution ecosystem.

Figure 2:
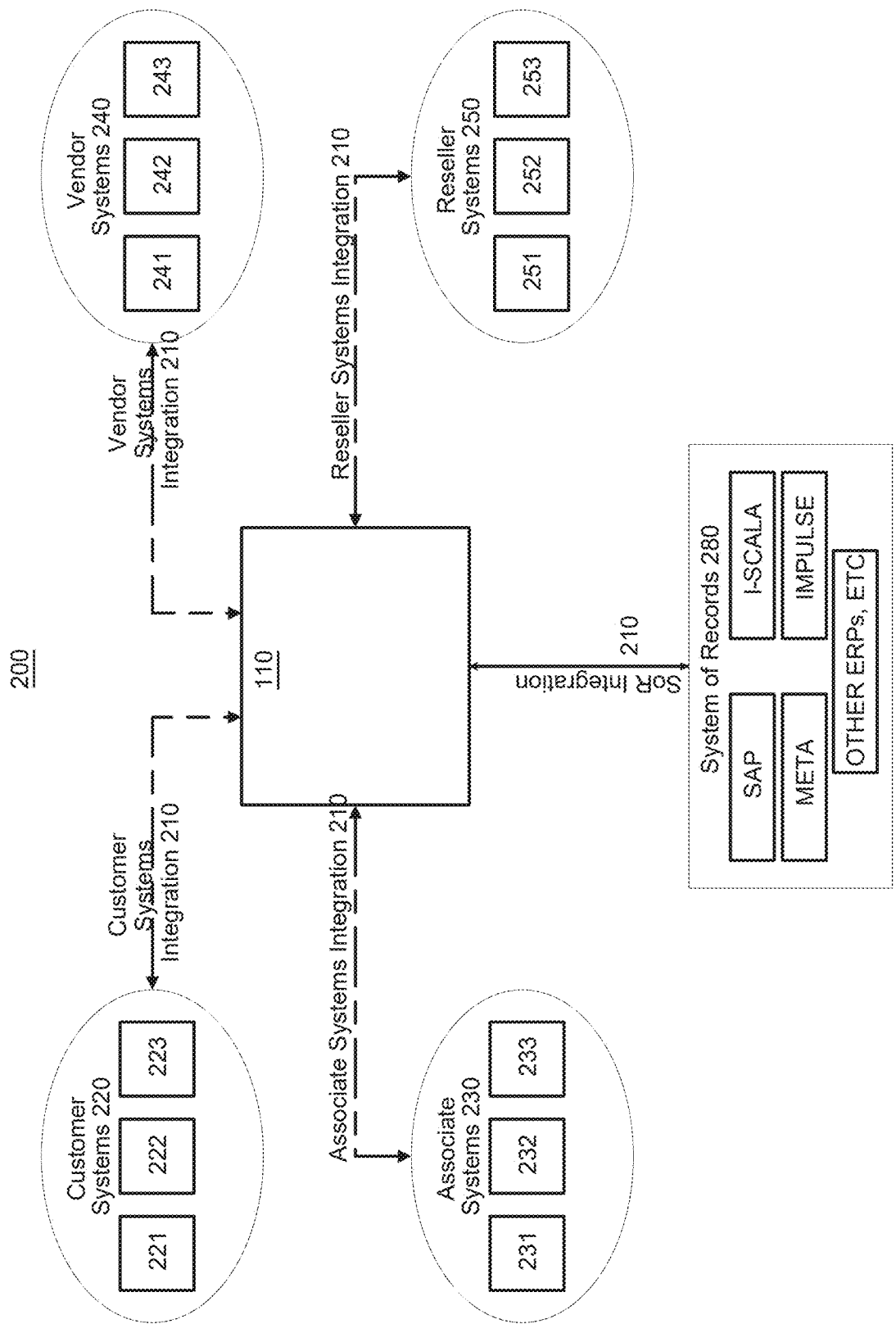
FIG. 2 illustrates one embodiment of an operating environment of the distribution platform, which builds upon the elements introduced in FIG. 1.

FIG. 2 illustrates an operating environment 200 of the distribution platform, which builds upon the elements introduced in FIG. 1. Within this operating environment, integration points 210 facilitate data flow and connectivity between various customer systems 220, vendor systems 240, reseller systems 260, and other entities involved in the distribution process. The diagram showcases the interconnectedness and the mechanisms that enable efficient collaboration and data-driven decision-making. This operating environment is configured to automate CTO and QTO processes utilizing advanced Artificial Intelligence (AI) and Machine Learning (ML) technologies to integrate, process, and analyze data. In this optional configuration, AI algorithms can be applied for real-time inventory management, customization options, and user choice optimization in a CTO process. Machine learning models such as neural networks and decision trees can be employed to provide more refined and personalized options to the user. Similarly, QTO processes can use ML-based algorithms for real-time pricing retrieval, discount application, and quote generation. Advanced analytics in the form of ensemble learning or reinforcement learning can be conducted to continually optimize both CTO and QTO processes.

Operating environment 200 can include System 110 as a distribution platform that serves as the central hub for managing and facilitating the distribution process. System 110 can be configured to perform functions and operations as a bridge between customer systems 220, vendor systems 240, reseller systems 260, and other entities within the ecosystem. It can integrate communication, data exchange, and transactional processes, providing users with a unified and streamlined experience. Moreover, operating environment 200 can include one or more integration points 210 to ensure smooth data flow and connectivity. These integration points include:

Customer System Integration: Integration point 210 can enable System 110 to connect with customer systems 220, enabling efficient data exchange and synchronization. Customer systems 220 may include various entities such as customer system 221, customer system 222, and customer system 223. These systems represent the internal systems utilized by customers, such as enterprise resource planning (ERP) or customer relationship management (CRM) systems. Integration with customer systems 220 empowers customers to access real-time inventory information, pricing details, order tracking, and other relevant data, enhancing their visibility and decision-making capabilities. The application of CTO and QTO processes ensures that customer systems 220 can engage in real-time product configuration and quotation processes through integration with System 110. Specifically, the CTO Module in System 110 can receive configuration requests from customer systems 220, fetch real-time inventory and customization options from its own databases, and return an optimized bill of materials (BOM). Similarly, the QTO Module can receive pricing inquiries, verify user permissions within customer systems 220, calculate applicable discounts, and return a dynamically generated quote. This data exchange can occur via APIs or direct module calls and can be routed through additional security or analytics modules as needed. Therefore, integration with customer systems 220 offers an automated, real-time solution for both product configuration and pricing tasks, thereby enhancing operational efficiency and decision-making capabilities for customers.

Associate System Integration: Integration point 210 can enable System 110 to connect with associate systems 230, enabling efficient data exchange and synchronization. Associate systems 230 may include various entities such as associate system 231, associate system 233, and associate system 233. Integration with associate systems 220 empowers customers to access real-time inventory information, pricing details, order tracking, and other relevant data, enhancing their visibility and decision-making capabilities.

Vendor System Integration: Integration point 210 facilitates the connection between System 110 and vendor systems 240. Vendor systems 240 may include entities such as vendor system 241, vendor system 242, and vendor system 243, representing the inventory management systems, pricing systems, and product catalogs employed by vendors. Integration with vendor systems 240 ensures that vendors can efficiently update their product offerings, manage pricing and promotions, and receive real-time order notifications and fulfillment details. CTO and QTO processes and components within System 110 enable vendor systems 240 to automate and optimize various aspects of product configuration and quoting. For instance, CTO processes within System 110 uses decision tree algorithms or machine learning models to request specific inventory or customization options from the vendor systems. This aids vendors in aligning their stock or manufacturing processes with real-time market demands. Additionally, the module employs recursive algorithms to compile Bills of Materials (BOMs) which can be communicated back to the vendor systems for inventory allocation or assembly.

QTO processes retrieve current pricing data, verify user permissions and calculates applicable discounts based on algorithms. A multi-variable linear regression model or more advanced machine learning models, like Random Forest, could be used to predict costs based on vendor-supplied data. Quotes generated in the QTO processes can then be transmitted to vendor systems for approval, adjustments, or record-keeping.

In a non-limiting example, CTO processes can request real-time inventory data from (for example, via vendor system 241), while QTO processes can query vendor data for the latest volume discount information. Real-time data exchange ensures that the vendors' inventory and pricing systems can be optimally utilized and that end-users have access to the most current and beneficial options. This integration significantly improves data accuracy and operational efficiency for both System 110 and vendor systems 240.

Reseller System Integration: Integration point 210 provides capabilities for reseller systems 260 to connect with System 110. Reseller systems 260 may encompass entities such as reseller system 261, reseller system 262, and reseller system 263, representing the sales systems, customer management systems, and service delivery platforms employed by resellers. Integration with reseller systems 260 empowers resellers to access current product information, manage customer accounts, track sales performance, and provide value-added services to their customers.

Other Entity System Integration: Integration point 210 also enables connectivity with other entities involved in the distribution process. These entities may include entities such as entity system 271, entity system 272, and entity system 273. Integration with these systems ensures communication and data exchange, facilitating collaboration and efficient distribution processes. In some embodiments, integration of CTO and QTO processes with other entity systems can ensure that entity systems 271 engage in real-time product configuration and quotation processes via System 110.

Integration points 210 also enable connectivity with System of Records 280, for additional data management and integration. Representing System of Records 280 can represent enterprise resource planning (ERP) systems or customer relationship management (CRM) systems, including both future systems as well as legacy ERP systems such as SAP, Impulse, META, I-SCALA, and others. System of Records can include one or more storage repositories of critical and legacy business data. It facilitates integration of data exchange and synchronization between the distribution platform, System 110, and the ERPs, enabling real-time updates and ensuring the availability of accurate and up-to-date information. Integration points 210 establish connectivity between the System of Records 280 and the distribution platform, allowing stakeholders to leverage rich data stored in the ERPs for efficient collaboration, data-driven decision-making, and streamlined distribution processes. These systems represent the internal systems utilized by customers, vendors, and others.

Integration points 210 within the operating environment 200 can be facilitated through standardized protocols, APIs, and data connectors. These mechanisms ensure compatibility, interoperability, and secure data transfer between the distribution platform and the connected systems. System 110 employs industry-standard protocols, such as RESTful APIs, SOAP, or GraphQL, to establish communication channels and enable data exchange.

In some embodiments, System 110 can incorporate authentication and authorization mechanisms to ensure secure access and data protection. Technologies such as OAuth or JSON Web Tokens (JWT) can be employed to authenticate users, authorize data access, and maintain the integrity and confidentiality of the exchanged information.

In some embodiments, integration points 210 and data flow within the operating environment 200 enable users to operate within a connected ecosystem. Data generated at various stages of the distribution process, including customer orders, inventory updates, shipment details, and sales analytics, flows between customer systems 220, vendor systems 240, reseller systems 260, and other entities. This data exchange facilitates real-time visibility, enables data-driven decision-making, and enhances operational efficiency throughout the distribution platform.

In some embodiments, System 110 leverages advanced technologies such as Typescript, NodeJS, ReactJS, .NET Core, C#, and other suitable technologies to support the integration points 210 and enable communication within the operating environment 200. These technologies provide a robust foundation for System 110, ensuring scalability, flexibility, and efficient data processing capabilities. Moreover, the integration points 210 may also employ algorithms, data analytics, and machine learning techniques to derive valuable insights, optimize distribution processes, and personalize customer experiences. Integration points 210 and data flow within the operating environment 200 enable users to operate within a connected ecosystem. Data generated at various touchpoints, including customer orders, inventory updates, pricing changes, or delivery status, flows between the different entities, systems, and components. The integrated data can be processed, harmonized, and made available in real-time to relevant users through System 110. This real-time access to accurate and current information empowers users to make informed decisions, optimize supply chain operations, and enhance customer experiences.

Several elements in the operating environment depicted in FIG. 2 can include conventional, well-known elements that are explained only briefly here. For example, each of the customer systems, such as customer systems 220, could include a desktop personal computer, workstation, laptop, PDA, cell phone, or any wireless access protocol (WAP) enabled device, or any other computing device capable of interfacing directly or indirectly with the Internet or other network connection. Each of the customer systems typically can run an HTTP client, such as Microsoft's Edge browser, Google's Chrome browser, Opera's browser, or a WAP-enabled browser for mobile devices, allowing customer systems to access, process, and view information, pages, and applications available from the distribution platform over the network.

Moreover, each of the customer systems can typically be equipped with user interface devices such as keyboards, mice, trackballs, touchpads, touch screens, pens, or similar devices for interacting with a graphical user interface (GUI)

provided by the browser. These user interface devices enable users of customer systems to navigate the GUI, interact with pages, forms, and applications, and access data and applications hosted by the distribution platform.

The customer systems and their components can be operator-configurable using applications, including web browsers, which run on central processing units such as Intel Pentium processors or similar processors. Similarly, the distribution platform (System 110) and its components can be operator-configurable using applications that run on central processing units, such as the processor system, which may include Intel Pentium processors or similar processors, and/or multiple processor units.

Computer program product embodiments include machine-readable storage media containing instructions to program computers to perform the processes described herein. The computer code for operating and configuring the distribution platform and the customer systems, vendor systems, reseller systems, and other entities' systems to intercommunicate, process webpages, applications, and other data, can be downloaded and stored on hard disks or any other volatile or non-volatile memory medium or device, such as ROM, RAM, floppy disks, optical discs, DVDs, CDs, micro-drives, magneto-optical disks, magnetic or optical cards, nano-systems, or any suitable media for storing instructions and data.

Furthermore, the computer code for implementing the embodiments can be transmitted and downloaded from a software source over the Internet or any other conventional network connection using communication mediums and protocols such as TCP/IP, HTTP, HTTPS, Ethernet, etc. The code can also be transmitted over extranets, VPNs, LANs, or other networks, and executed on client systems, servers, or server systems using programming languages such as C, C++, HTML, Java, JavaScript, ActiveX, VBScript, and others.

It will be appreciated that the embodiments can be implemented in various programming languages executed on client systems, servers, or server systems, and the choice of language may depend on the specific requirements and environment of the distribution platform.

Thereby, operating environment 200 can couple a distribution platform with one or more integration points 210 and data flow to enable efficient collaboration and streamlined distribution processes.

Figure 3:
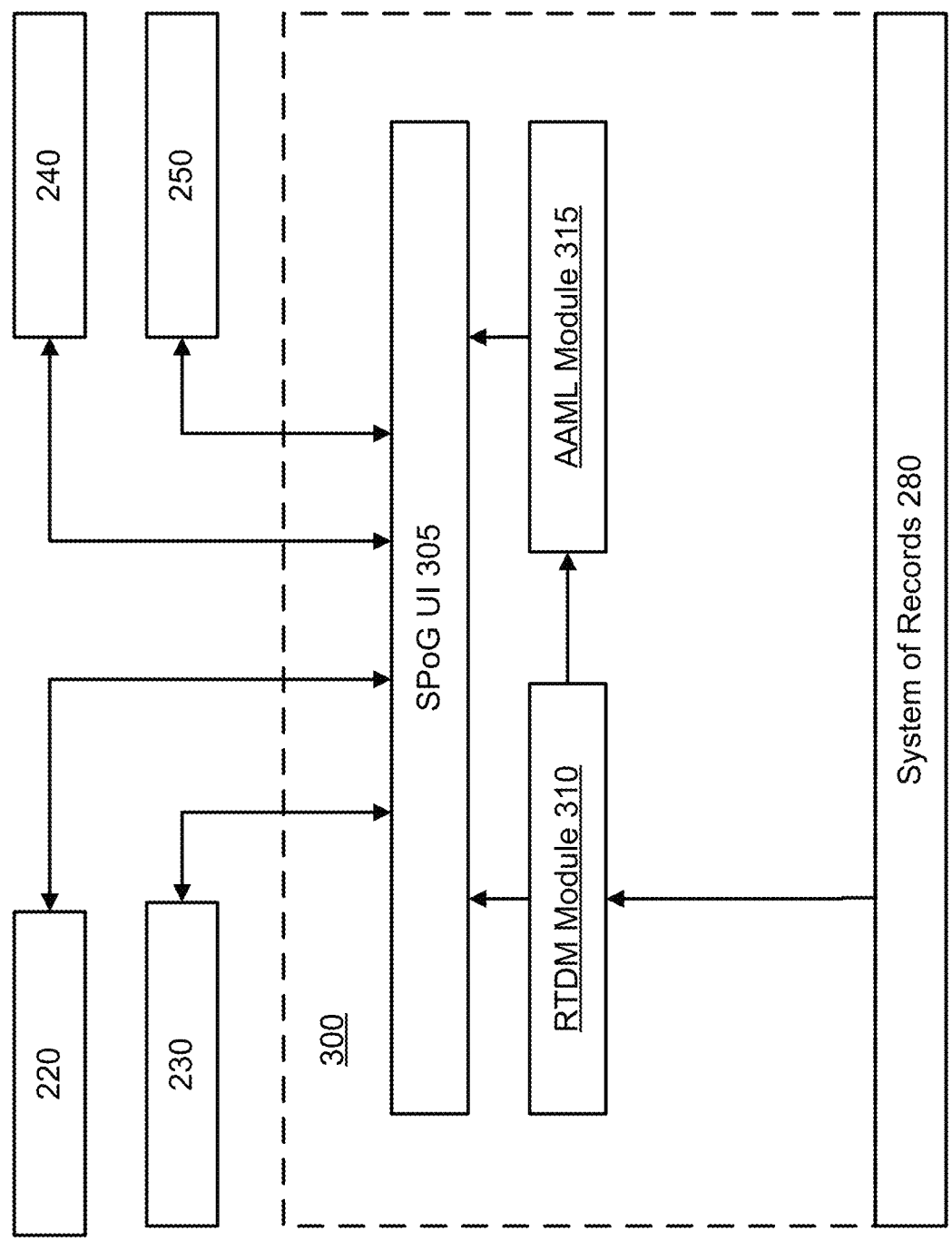
FIG. 3 illustrates an embodiment of a system for distribution management.

FIG. 3 illustrates a system 300 for supply chain and distribution management. System 300 (FIG. 3) is a supply chain and distribution management solution configured to address the challenges faced by fragmented distribution ecosystems in the global distribution industry. System 300 can include several interconnected components and modules that work in harmony to optimize supply chain and distribution operations, enhance collaboration, and drive business efficiency.

The Single Pane of Glass (SPoG) UI 305 serves as a centralized user interface, providing users with a unified view of the entire supply chain. It consolidates information from various sources and presents real-time data, analytics, and functionalities tailored to the specific roles and responsibilities of users. By offering a customizable and intuitive dashboard-style layout, the SPoG UI enables users to access relevant information and tools, empowering them to make data-driven decisions and efficiently manage their supply chain and distribution activities.

For example, a logistics manager can use the SPoG UI to monitor the status of shipments, track delivery routes, and view real-time inventory levels across multiple warehouses. They can visualize data through interactive charts and graphs, such as a map displaying the current location of each shipment or a bar chart showing inventory levels by product category. By having a unified view of the supply chain, the logistics manager can identify bottlenecks, optimize routes, and ensure timely delivery of goods.

The SPoG UI 305 integrates with other modules of System 300, facilitating real-time data exchange, synchronized operations, and streamlined workflows. Through API integrations, data synchronization mechanisms, and event-driven architectures, SPoG UI 305 ensures smooth information flow and enables collaborative decision-making across the distribution ecosystem.

For instance, when a purchase order is generated in the SPoG UI, the system automatically updates the inventory levels, triggers a notification to the warehouse management system, and initiates the shipping process. This integration enables efficient order fulfillment, reduces manual errors, and enhances overall supply chain visibility.

The Real-Time Data Mesh (RTDM) module 310 is another component of System 300, responsible for ensuring the flow of data within the distribution ecosystem. It aggregates data from multiple sources, harmonizes it, and ensures its availability in real-time.

In a distribution network, the RTDM module collects data from various systems, including inventory management systems, point-of-sale terminals, and customer relationship management systems. It harmonizes this data by aligning formats, standardizing units of measurement, and reconciling any discrepancies. The harmonized data can be then made available in real-time, allowing users to access accurate and current information across the supply chain.

The RTDM module 310 can be configured to capture changes in data across multiple transactional systems in real-time. It employs a sophisticated Change Data Capture (CDC) mechanism that constantly monitors the transactional systems, detecting any updates or modifications. The CDC component can be specifically configured to work with various transactional systems, including legacy ERP systems, Customer Relationship Management (CRM) systems, and other enterprise-wide systems, ensuring compatibility and flexibility for businesses operating in diverse environments.

By having access to real-time data, users can make timely decisions and respond quickly to changing market conditions. For example, if the RTDM module detects a sudden spike in demand for a particular product, it can trigger alerts to the production team, enabling them to adjust manufacturing schedules and prevent stockouts.

The RTDM module 310 facilitates data management within supply chain operations. It enables real-time harmonization of data from multiple sources, freeing vendors, resellers, customers, and end customers from constraints imposed by legacy ERP systems. This enhanced flexibility supports improved efficiency, customer service, and innovation.

Another component of System 300 is the Advanced Analytics and Machine Learning (AAML) module 315. Leveraging powerful analytics tools and algorithms such as Apache Spark, TensorFlow, or scikit-learn, the AAML module extracts valuable insights from the collected data. It enables advanced analytics, predictive modeling, anomaly detection, and other machine learning capabilities.

For instance, the AAML module can analyze historical sales data to identify seasonal patterns and predict future demand. It can generate forecasts that help optimize inventory levels, ensure stock availability during peak seasons, and minimize excess inventory costs. By leveraging machine learning algorithms, the AAML module automates repetitive tasks, predicts customer preferences, and optimizes supply chain processes.

In addition to demand forecasting, the AAML module can provide insights into customer behavior, enabling targeted marketing campaigns and personalized customer experiences. For example, by analyzing customer data, the module can identify cross-selling or upselling opportunities and recommend relevant products to individual customers.

Furthermore, the AAML module can analyze data from various sources, such as social media feeds, customer reviews, and market trends, to gain a deeper understanding of consumer sentiment and preferences. This information can be used to inform product development decisions, identify emerging market trends, and adapt business strategies to meet evolving consumer expectations.

System 300 emphasizes integration and interoperability to connect with existing enterprise systems such as ERP systems, warehouse management systems, and customer relationship management systems. By establishing connections and data flows between these systems, System 300 enables smooth data exchange, process automation, and end-to-end visibility across the supply chain. Integration protocols, APIs, and data connectors facilitate communication and interoperability among different modules and components, creating a holistic and connected distribution ecosystem.

The implementation and deployment of System 300 can be tailored to meet specific business needs. It can be deployed as a cloud-native solution using containerization technologies like Docker and orchestration frameworks like Kubernetes. This approach ensures scalability, easy management, and efficient updates across different environments. The implementation process involves configuring the system to align with specific supply chain requirements, integrating with existing systems, and customizing the modules and components based on the business's needs and preferences.

System 300 for supply chain and distribution management is a comprehensive and innovative solution that addresses the challenges faced by fragmented distribution ecosystems. It combines the power of the SPoG UI 305, the RTDM module 310, and the AAML module 315, along with integration with existing systems. By leveraging a diverse technology stack, scalable architecture, and robust integration capabilities, System 300 provides end-to-end visibility, data-driven decision-making, and optimized supply chain operations. The examples and options provided in this description are non-limiting and can be customized to meet specific industry requirements, driving efficiency and success in supply chain and distribution management.

Figure 4:
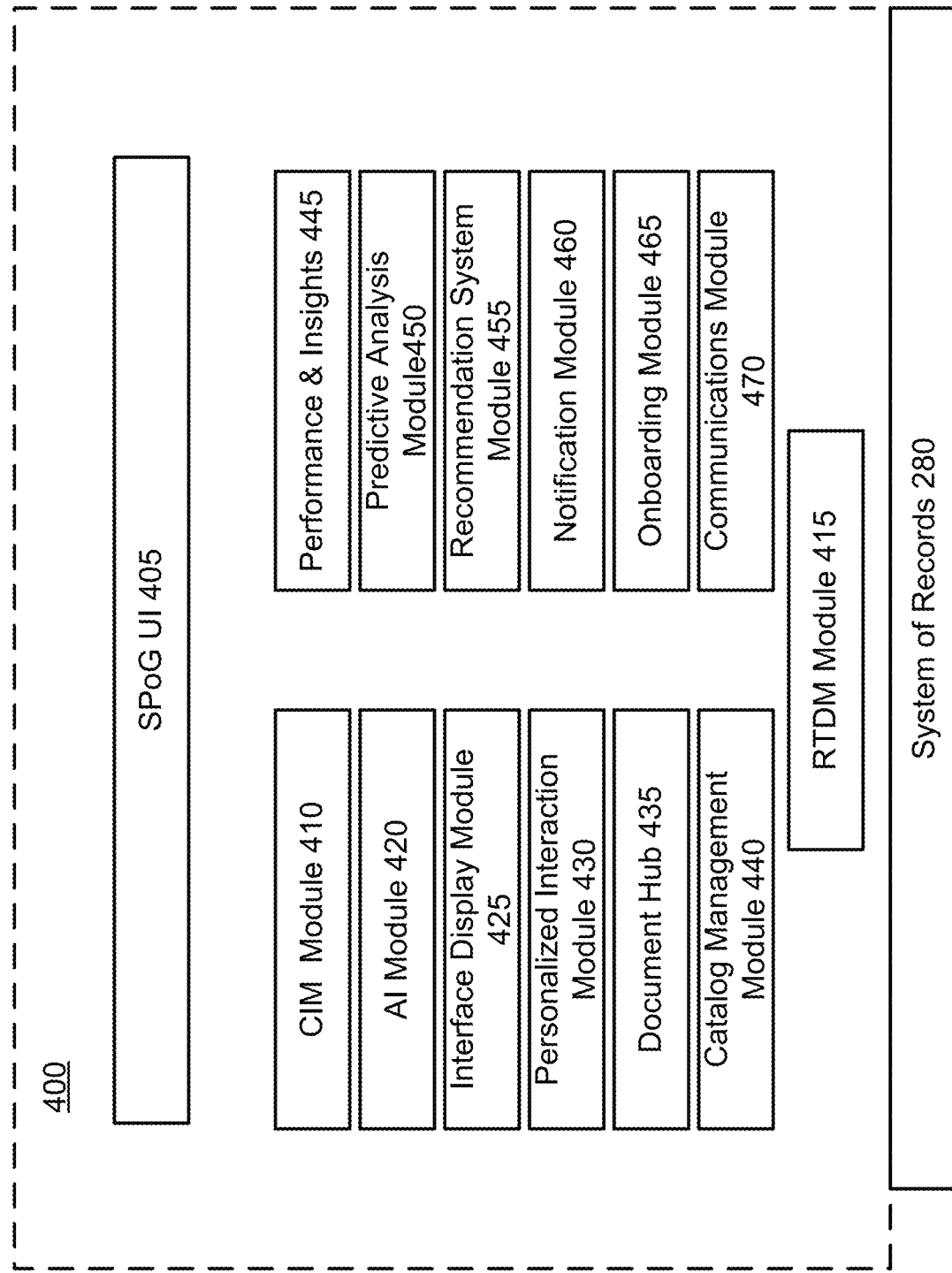
FIG. 4 depicts a system for automated Configure to Order (CTO) and Quote to Order (QTO) processes, according to an embodiment.

FIG. 4 depicts an embodiment of System 400 for automating Configure to Order (CTO) and Quote to Order (QTO) processes. FIG. 4 depicts an embodiment of System 400 for automating Configure to Order (CTO) and Quote to Order (QTO) processes. System 400 is composed of various components, including a Data Mesh 410, a Single Pane of Glass User Interface (SPoG UI) 405, and an AI Module 460.

The SPoG UI 405 serves as the primary user interface. Users interact with this interface to perform various tasks related to CTO and QTO processes. It displays real-time data from the Data Mesh 410 and provides controls for initiating actions in System 400. For example, a user can create a bill of materials or initiate a quote directly from the SPoG UI 405. The SPoG UI is developed using web-based technologies, allowing it to be accessed from various types of devices such as desktop computers, laptops, tablets, and smartphones.

Data Mesh 410 is provided for data aggregation, transformation, and dissemination. It pulls data from various Ingram Micro and Vendor platforms, as well as third-party databases. The data types can range from pricing information to material specifications. Data Mesh 410 acts as a centralized repository that stores the standardized data, allowing various operational components to access consistent and up-to-date information. Data Mesh 410 can synchronize with system of records 280 that integrates with various enterprise systems. Data feeds provided by Data Mesh 410 and/or system of records 280 are established to retrieve relevant information from the system of records, such as sales orders, purchase orders, inventory data, and customer information. These feeds enable real-time data updates and ensure that the RTDM module operates with the most current and accurate data. Data Mesh 410 and/or system of records 280 can use APIs and other data connectors for this purpose. It standardizes the data into a uniform format, which is then made available to other components in System 400, including the SPoG UI 405 and the AI Module 460.

AI Module 460 is a software layer responsible for automating the CTO and QTO processes. It contains intelligent rules and algorithms for automating actions like deal registration, pricing application, and quote creation. The AI Module 460 interacts with both the SPoG UI 405 and the Data Mesh 410. When a user initiates an action from the SPoG UI 405, the AI Module 460 receives the input, processes it based on pre-defined rules, and then interacts with the Data Mesh 410 to fetch or update the necessary data.

Included within AI Module 460 are specialized sub-modules for CTO and QTO: CTO Module 420 and QTO Module 425. Alternatively, CTO Module 420 and/or QTO Module 425 can be implemented externally to AI Module 460, operatively connected thereto. When a user requests creation of a new quote, QTO Module 425 triggers a series of automated steps. These steps may include checking for existing customer data, pulling real-time pricing information from the Data Mesh 410, applying applicable discounts, and generating the quote. Once the quote is generated, it is displayed on the SPoG UI 405 for user review and further actions. Similarly, the CTO Module 420 handles tasks specific to Configure to Order processes.

AI Module 460 also includes error-checking algorithms. These algorithms validate the configurations, pricing, and authorizations for each CTO or QTO process. If an error or discrepancy is found, the AI Module 460 flags it for user review or automatic correction. Data Mesh 410 may be implemented or supplemented for higher scalability and fault tolerance. Similarly, AI Module 460 could incorporate machine learning models to improve the efficiency and accuracy of its automation rules over time. AI Module may be configured to connect to a reporting or notification module to provide insights related to the CTO and/or QTO processes, including insights related to into the efficiency and effectiveness of the CTO and/or QTO processes. This module could use the data from the Data Mesh 410 and process histories from the AI Module 460 to generate various types of reports and dashboards.

In an embodiment, System 400 can be extended to include a vendor management layer to facilitate real-time negotiation of pricing and terms directly within the SPoG UI 405. System 400 can be configured to work with multiple operating systems and is compatible with cloud-based architectures. It can be deployed on-premises or as a Software as a Service (SaaS) model.

System 400 can be configured to integrate multiple third-party systems and disparate data into a single interface via the SPoG UI 405, automate and coordinate various activities through the AI Module 460, and maintain a standardized, real-time data repository through the Data Mesh 410. By doing so, it allows for efficient and error-minimized CTO and QTO processes.

Figure 5:
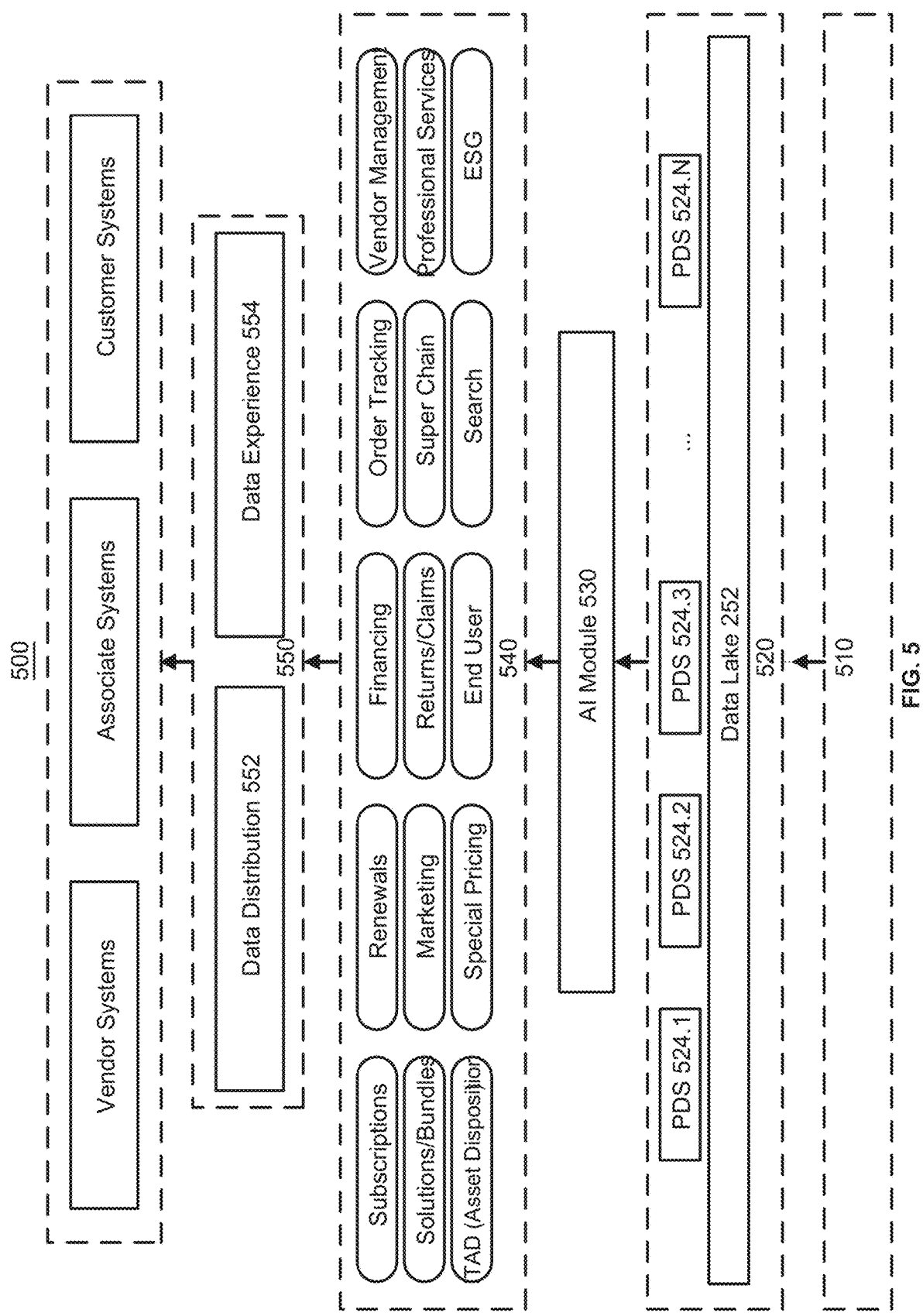
FIG. 5 illustrates an RTDM module, according to an embodiment.

FIG. 5 depicts an embodiment of an advanced distribution platform including System 500 for managing a complex distribution network, which can be an embodiment of System 300, and provides a technology distribution platform for optimizing the management and operation of distribution networks. System 500 includes several interconnected modules, each serving specific functions and contributing to the overall efficiency of supply chain operations. In some embodiments, these modules can include SPoG UI 505, CIM 510, RTDM module 515, AI module 520, Interface Display Module 525, Personalized Interaction Module 530, Document Hub 535, Catalog Management Module 540, Performance and Insight Markers Display 545, Predictive Analytics Module 550, Recommendation System Module 555, Notification Module 560, Self-Onboarding Module 565, and Communication Module 570.

System 500, as an embodiment of System 300, can use a range of technologies and algorithms to enable supply chain and distribution management. These technologies and algorithms facilitate efficient data processing, personalized interactions, real-time analytics, secure communication, and effective management of documents, catalogs, and performance metrics.

The SPoG UI 505, in some embodiments, serves as the central interface within System 500, providing users with a unified view of the entire distribution network. It utilizes frontend technologies such as ReactJS, TypeScript, and Node.js to create interactive and responsive user interfaces. These technologies enable the SPoG UI 505 to deliver a user-friendly experience, allowing users to access relevant information, navigate through different modules, and perform tasks efficiently.

The CIM 510, or Customer Interaction Module, employs algorithms and technologies such as Oracle Eloqua, Adobe Target, and Okta to manage customer relationships within the distribution network. These technologies enable the module to handle customer data securely, personalize customer experiences, and provide access control for users.

The RTDM module 515, or Real-Time Data Mesh module, is a component of System 500 that ensures the smooth flow of data across the distribution ecosystem. It utilizes technologies such as Apache Kafka, Apache Flink, or Apache Pulsar for data ingestion, processing, and stream management. These technologies enable the RTDM module 515 to handle real-time data streams, process large volumes of data, and ensure low-latency data processing. Additionally, the module employs Change Data Capture (CDC) mechanisms to capture real-time data updates from various transactional systems, such as legacy ERP systems and CRM systems. This capability allows users to access current and accurate information for informed decision-making.

The AI module 520 within System 500 can use advanced analytics and machine learning algorithms, including Apache Spark, TensorFlow, and scikit-learn, to extract valuable insights from data. These algorithms enable the module to automate repetitive tasks, predict demand patterns, optimize inventory levels, and improve overall supply chain efficiency. For example, the AI module 520 can utilize predictive models to forecast demand, allowing users to optimize inventory management and minimize stockouts or overstock situations.

The Interface Display Module 525 focuses on presenting data and information in a clear and user-friendly manner. It utilizes technologies such as HTML, CSS, and JavaScript frameworks like ReactJS to create interactive and responsive user interfaces. These technologies allow users to visualize data using various data visualization techniques, such as graphs, charts, and tables, enabling efficient data comprehension, comparison, and trend analysis.

The Personalized Interaction Module 530 utilizes customer data, historical trends, and machine learning algorithms to generate personalized recommendations for products or services. It employs technologies like Adobe Target, Apache Spark, and TensorFlow for data analysis, modeling, and delivering targeted recommendations. For example, the module can analyze customer preferences and purchase history to provide personalized product recommendations, enhancing customer satisfaction and driving sales.

The Document Hub 535 serves as a centralized repository for storing and managing documents within System 500. It utilizes technologies like SeeBurger and Elastic Cloud for efficient document management, storage, and retrieval. For instance, the Document Hub 535 can employ SeeBurger's document management capabilities to categorize and organize documents based on their types, such as contracts, invoices, product specifications, or compliance documents, allowing users to easily access and retrieve relevant documents when needed.

The Catalog Management Module 540 enables the creation, management, and distribution of current product catalogs. It ensures that users have access to the latest product information, including specifications, pricing, availability, and promotions. Technologies like Kentico and Akamai can be employed to facilitate catalog updates, content delivery, and caching. For example, the module can use Akamai's content delivery network (CDN) to deliver catalog information to users quickly and efficiently, regardless of their geographical location.

The Performance and Insight Markers Display 545 collects, analyzes, and visualizes real-time performance metrics and insights related to supply chain operations. It utilizes tools like Splunk and Datadog to enable effective performance monitoring and provide actionable insights. For instance, the module can utilize Splunk's log analysis capabilities to identify performance bottlenecks in the supply chain, enabling users to take proactive measures to optimize operations.

The Predictive Analytics Module 550 employs machine learning algorithms and predictive models to forecast demand patterns, optimize inventory levels, and enhance overall supply chain efficiency. It utilizes technologies such as Apache Spark and TensorFlow for data analysis, modeling, and prediction. For example, the module can utilize TensorFlow's deep learning capabilities to analyze historical sales data and predict future demand, allowing users to optimize inventory levels and minimize costs.

The Recommendation System Module 555 focuses on providing intelligent recommendations to users within the distribution network. It generates personalized recommendations for products or services based on customer data, historical trends, and machine learning algorithms. Technologies like Adobe Target and Apache Spark can be employed for data analysis, modeling, and delivering targeted recommendations. For instance, the module can use Adobe Target's recommendation engine to analyze customer preferences and behavior, and deliver personalized product recommendations across various channels, enhancing customer engagement and driving sales.

The Notification Module 560 enables the distribution of real-time notifications to users regarding important events, updates, or alerts within the supply chain. It utilizes technologies like Apigee X and TIBCO for message queues, event-driven architectures, and notification delivery. For example, the module can utilize TIBCO's messaging infrastructure to send real-time notifications to users' devices, ensuring timely and relevant information dissemination.

The Self-Onboarding Module 565 facilitates the onboarding process for new users entering the distribution network. It provides guided steps, tutorials, or documentation to help users become familiar with the system and its functionalities. Technologies such as Okta and Kentico can be employed to ensure secure user authentication, access control, and self-learning resources. For instance, the module can utilize Okta's identity and access management capabilities to securely onboard new users, providing them with appropriate access permissions and guiding them through the system's functionalities.

The Communication Module 570 enables communication and collaboration within System 500. It provides channels for users to interact, exchange messages, share documents, and collaborate on projects. Technologies like Apigee Edge and Adobe Launch can be employed to facilitate secure and efficient communication, document sharing, and version control. For example, the module can utilize Apigee Edge's API management capabilities to ensure secure and reliable communication between users, enabling them to collaborate effectively.

Thereby, System 500 can incorporate various modules that utilize a diverse range of technologies and algorithms to optimize supply chain and distribution management. These modules, including SPoG UI 505, CIM 510, RTDM module 515, AI module 520, Interface Display Module 525, Personalized Interaction Module 530, Document Hub 535, Catalog Management Module 540, Performance and Insight Markers Display 545, Predictive Analytics Module 550, Recommendation System Module 555, Notification Module 560, Self-Onboarding Module 565, and Communication Module 570, work together to provide end-to-end visibility, data-driven decision-making, personalized interactions, real-time analytics, and streamlined communication within the distribution network. The incorporation of specific technologies and algorithms enables efficient data management, secure communication, personalized experiences, and effective performance monitoring, contributing to enhanced operational efficiency and success in supply chain and distribution management.

Real Time Data Mesh

Figure 6:
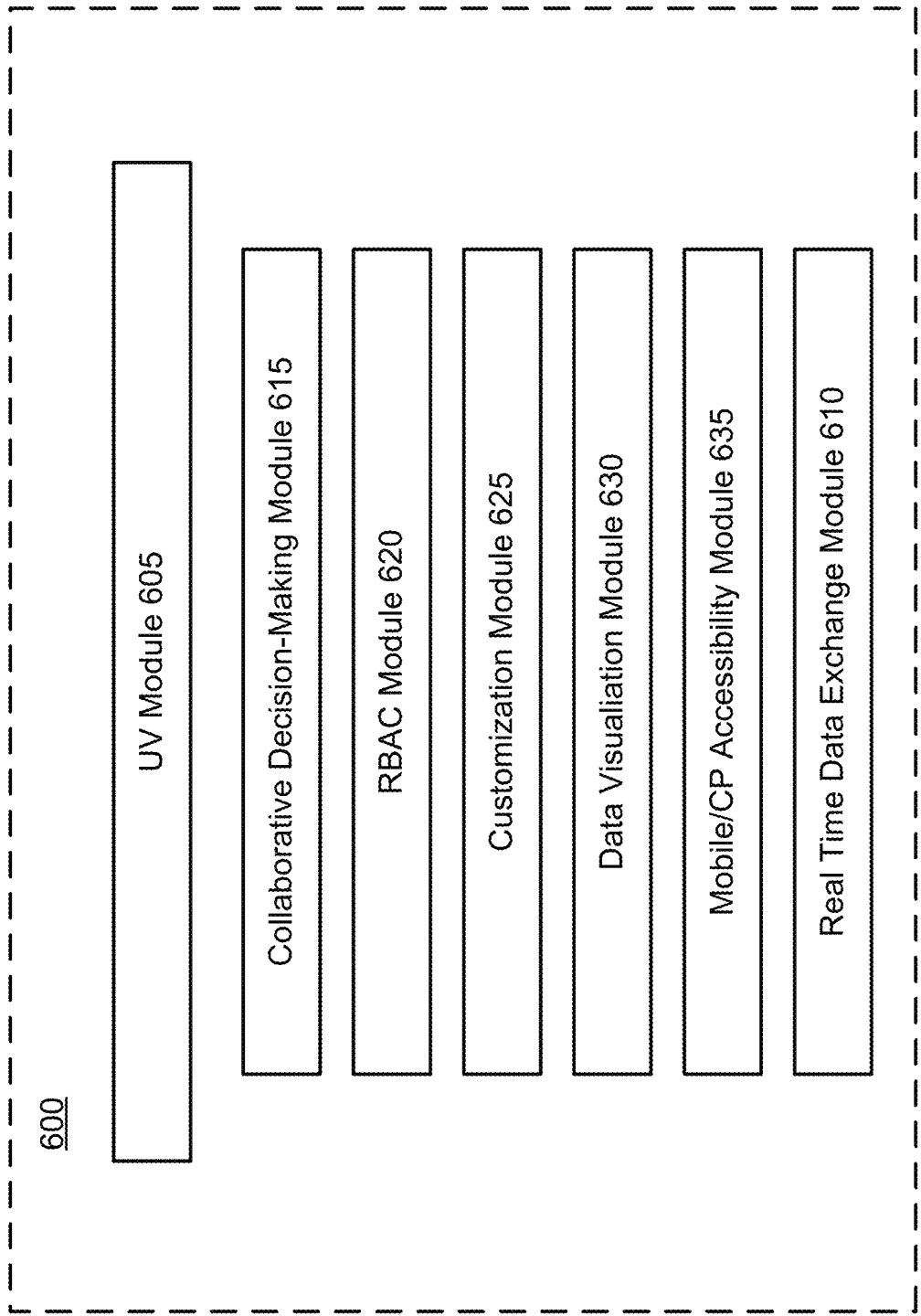
FIG. 6 illustrates a SPoG UI, according to an embodiment.

FIG. 6 illustrates RTDM module 600, according to an embodiment. RTDM module 600, which can be an embodiment of RTDM module 310, can include interconnected components, processes, and sub-systems configured to enable real-time data management and analysis.

The RTDM module 600, as depicted in FIG. 5, represents an effective data mesh and change capture component within the overall system architecture. The module can be configured to provide real-time data management and standardization capabilities, enabling efficient operations within the supply chain and distribution management domain.

RTDM module 600 can include an integration layer 610 (also referred to as a "system of records") that integrates with various enterprise systems. These enterprise systems can include ERPs such as SAP, Impulse, META, and I-SCALA, among others, and other data sources. Integration layer 610 can process data exchange and synchronization between RTDM module 600 and these systems. Data feeds can be established to retrieve relevant information from the system of records, such as sales orders, purchase orders, inventory data, and customer information. These feeds enable real-time data updates and ensure that the RTDM module operates with the most current and accurate data.

RTDM module 600 can include data layer 620 configured to process and translate data for retrieval and analysis. Data layer 620 includes data mesh, a cloud-based infrastructure configured to provide scalable and fault-tolerant data storage capabilities. Within the data mesh, multiple Purposive Datastores (PDS) can be deployed to store specific types of data, such as customer data, product data, or inventory data. Each PDS can be optimized for efficient data retrieval based on specific use cases and requirements. The PDSes can be configured to store specific types of data, such as customer data, product data, finance data, and more. These PDS serve as repositories for canonized and/or standardized data, ensuring data consistency and integrity across the system.

In some embodiments, RTDM module 600 implements a data replication mechanism to capture real-time changes from multiple data sources, including transactional systems like ERPs (e.g., SAP, Impulse, META, I-SCALA). The captured data can then be processed and standardized on-the-fly, transforming it into a standardized format suitable for analysis and integration. This process ensures that the data is readily available and current within the data mesh, facilitating real-time insights and decision-making.

More specifically, data layer 620 within the RTDM module 600 can be configured as a powerful and flexible foundation for managing and processing data within the distribution ecosystem. In some embodiments, data layer 620 can encompasses a highly scalable and robust data lake, which can be referred to as data lake 622, along with a set of purposive datastores (PDSes), which can be denoted as PDSes 624.1 to 624.N. These components integrate to ensure efficient data management, standardization, and real-time availability.

Data layer 620 incudes data lake 622, a state-of-the-art storage and processing infrastructure configured to handle the ever-increasing volume, variety, and velocity of data generated within the supply chain. Built upon a scalable distributed file system, such as Apache Hadoop Distributed File System (HDFS) or Amazon S3, the data lake provides a unified and scalable platform for storing both structured and unstructured data. Leveraging the elasticity and fault-tolerance of cloud-based storage, data lake 622 can accommodate the influx of data from diverse sources.

Associated with data lake 622, a population of purposive datastores, PDSes 624.1 to 624.N, can be employed. Each PDS 624 can function as a purpose-built repository optimized for storing and retrieving specific types of data relevant to the supply chain domain. In some non-limiting examples, PDS 624.1 may be dedicated to customer data, storing information such as customer profiles, preferences, and transaction history. PDS 624.2 may be focused on product data, encompassing details about SKU codes, descriptions, pricing, and inventory levels. These purposive datastores allow for efficient data retrieval, analysis, and processing, catering to the diverse needs of supply chain users.

To ensure real-time data synchronization, data layer 620 can be configured to employ one or more change data capture (CDC) mechanisms. These CDC mechanisms can be integrated with the transactional systems, such as legacy ERPs like SAP, Impulse, META, and I-SCALA, as well as other enterprise-wide systems. CDC constantly monitors these systems for any updates, modifications, or new transactions and captures them in real-time. By capturing these changes, data layer 620 ensures that the data within the data lake 622 and PDSes 624 remains current, providing users with real-time insights into the distribution ecosystem.

In some embodiments, data layer 620 can be implemented to facilitate integration with existing enterprise systems using one or more frameworks, such as NET or Java, ensuring compatibility with a wide range of existing systems and providing flexibility for customization and extensibility. For example, data layer 620 can utilize the Java technology stack, including frameworks like Spring and Hibernate, to facilitate integration with a system of records having a population of diverse ERP systems and other enterprise-wide solutions. This can facilitate smooth data exchange, process automation, and end-to-end visibility across the supply chain.

In terms of data processing and analytics, data layer 620 can use the capabilities of distributed computing frameworks, such as Apache Spark or Apache Flink in some non-limiting examples. These frameworks can enable parallel processing and distributed computing across large-scale datasets stored in the data lake and PDSes. By leveraging these frameworks, supply chain users can perform complex analytical tasks, apply machine learning algorithms, and derive valuable insights from the data. For instance, data layer 620 can use Apache Spark's machine learning libraries to develop predictive models for demand forecasting, optimize inventory levels, and identify potential supply chain risks.

In some embodiments, data layer 620 can incorporate robust data governance and security measures. Fine-grained access control mechanisms and authentication protocols ensure that only authorized users can access and modify the data within the data lake and PDSes. Data encryption techniques, both at rest and in transit, safeguard the sensitive supply chain information against unauthorized access. Additionally, data layer 620 can implement data lineage and audit trail mechanisms, allowing users to trace the origin and history of data, ensuring data integrity and compliance with regulatory requirements.

In some embodiments, data layer 620 can be deployed in a cloud-native environment, leveraging containerization technologies such as Docker and orchestration frameworks like Kubernetes. This approach ensures scalability, resilience, and efficient resource allocation. For example, data layer 620 can be deployed on cloud infrastructure provided by AWS, Azure, or Google Cloud, utilizing their managed services and scalable storage options. This allows for scaling of resources based on demand, minimizing operational overhead and providing an elastic infrastructure for managing supply chain data.

Data layer 620 of RTDM module 600 can incorporate a highly scalable data lake, data lake 622, along with purpose-built PDSes, PDSes 624.1 to 624.N, and employing CDC mechanisms, data layer 620 ensures efficient data management, standardization, and real-time availability. In a non-limiting example, Data Layer 620 can be implemented utilizing any appropriate technology, such as .NET or Java, and/or distributed computing frameworks like Apache Spark, enables powerful data processing, advanced analytics, and machine learning capabilities. With robust data governance and security measures, data layer 620 ensures data integrity, confidentiality, and compliance. Through its scalable infrastructure and integration with existing systems, data layer 620 enables supply chain users to make data-driven decisions, optimize operations, and drive business success in the dynamic and complex distribution environment.

RTDM module 600 can include an AI module 630 configured to implement one or more algorithms and machine learning models to analyze the stored data in data layer 620 and derive meaningful insights. In some non-limiting examples, AI module 630 can apply predictive analytics, anomaly detection, and optimization algorithms to identify patterns, trends, and potential risks within the supply chain. AI module 630 can continuously learns from new data inputs and adapts its models to provide accurate and current insights. AI module 630 can generate predictions, recommendations, and alerts and publish such insights to dedicated data feeds.

Data engine layer 640 comprises a set of interconnected systems responsible for data ingestion, processing, transformation, and integration. Data engine layer 640 of RTDM module 600 can include a collection of headless engines 640.1 to 640.N that operate autonomously. These engines represent distinct functionalities within the system and can include, for example, one or more recommendation engines, insights engines, and subscription management engines. Engines 640.1 to 640.N can use the standardized data stored in the data mesh to deliver specific business logic and services. Each engine can be configured to be pluggable, allowing for flexibility and future expansion of the module's capabilities. Exemplary engines are shorn in FIG. 5, which are not intended to be limiting. Any additional headless engine can be included in data engine layer 640 or in other exemplary layers of the disclosed system.

These systems can be configured to receive data from multiple sources, such as transactional systems, IoT devices, and external data providers. The data ingestion process involves extracting data from these sources and transforming it into a standardized format. Data processing algorithms can be applied to cleanse, aggregate, and enrich the data, making it ready for further analysis and integration.

Further, to facilitate integration and access to RTDM module 600, a data distribution mechanism can be employed. Data distribution mechanism 645 can be configured to include one or more APIs to facilitate distribution of data from the data mesh and engines to various endpoints, including user interfaces, micro front ends, and external systems.

Experience layer 650 focuses on delivering an intuitive and user-friendly interface for interacting with supply chain data. Experience layer 650 can include data visualization tools, interactive dashboards, and user-centric functionalities. Through this layer, users can retrieve and analyze real-time data related to various supply chain metrics such as inventory levels, sales performance, and customer demand. The user experience layer supports personalized data feeds, allowing users to customize their views and receive relevant updates based on their roles and responsibilities. Users can subscribe to specific data updates, such as inventory changes, pricing updates, or new SKU notifications, tailored to their preferences and roles.

Thereby, in some embodiments, RTDM module 600 for supply chain and distribution management can include an integration with a system of records and include one or more of a data layer with a data mesh and purposive datastores, an AI component, a data engine layer, and a user experience layer. These components work together to provide users with intuitive access to real-time supply chain data, efficient data processing and analysis, and integration with existing enterprise systems. The technical feeds and retrievals within the module ensure that users can retrieve relevant, current information and insights to make informed decisions and optimize supply chain operations. Accordingly, RTDM module 600 facilitates supply chain and distribution management by providing a scalable, real-time data management solution. Its innovative architecture allows for the rich integration of disparate data sources, efficient data standardization, and advanced analytics capabilities. The module's ability to replicate and standardize data from diverse ERPs, while maintaining auditable and repeatable transactions, provides a distinct advantage in enabling a unified view for vendors, resellers, customers, end customers, and other entities in a distribution system, including an IT distribution system.

Configure to Order (CTO) and Quote to Order (QTO)

Figure 7:
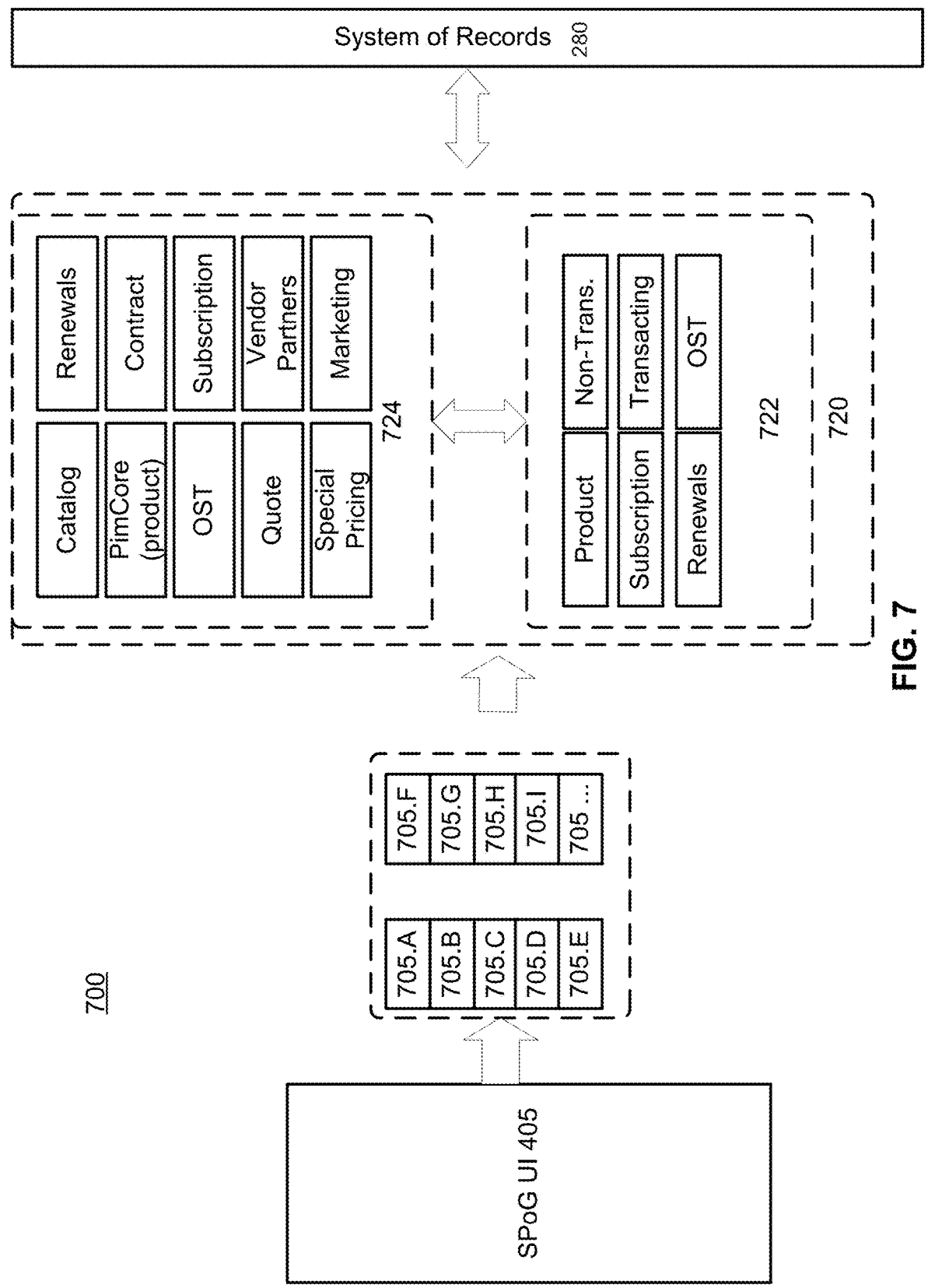
FIG. 7 illustrates a system for automated Configure to Order (CTO) and Quote to Order (QTO) processes, according to an embodiment.

In an embodiment, FIG. 7 depicts system 700 for automating Configure to Order (CTO) and Quote to Order (QTO) processes. The system 700 includes the Real-Time Data Mesh 710, Single Pane of Glass User Interface (SPoG UI) 705, Advanced Analytics and Machine-Learning (AAML) Module 715, Configuration to Order (CTO) Module 720, and Quote to Order (QTO) Module 725.

In an embodiment, the Configuration to Order (CTO) Module 720 and the Quote to Order (QTO) Module 725 include various functional sub-components designed for specific processes. These modules closely interact with other system components, namely the Single Pane of Glass User Interface (SPoG UI) 705, the Real-Time Data Mesh (RTDM) 710, and the Advanced Analytics and Machine Learning (AAML) Module 715.

The CTO Module 720 focuses specifically on Configure to Order processes. It contains sub-routines and algorithms dedicated to tasks such as bill of materials generation, deal registration, and pricing application. When a user initiates a CTO action from the SPoG UI 705, the request can be routed to the CTO Module 720 within the AAML 715. The module processes the request, interacts with the Real-Time Data Mesh 710 for requisite data, and executes the configuration. Post-execution, results can be displayed on the SPoG UI 705. The CTO Module 720 also incorporates a logging mechanism to track all configuration changes for auditing purposes.

The CTO Module 720 integrates several critical sub-components. The Configuration Builder 720.1 serves as an algorithmic guide, leading the user through product customization. This algorithm activates when a user selects a product for customization in the SPoG UI 705. It fetches real-time data from the RTDM 710, ensuring that all customization options currently exist in inventory. The Configuration Builder 720.1 can use a decision tree algorithm to offer compatible choices based on previous selections. The decision tree algorithm employed by Configuration Builder 720.1 can use entropy minimization for optimal choice selection.

Another sub-component, the Bill of Materials (BOM) Generator 720.2, assembles a detailed list of parts, assemblies, and other necessary components. It matches this information against real-time inventory data from the RTDM 710, using RESTful APIs or similar data connectors. The BOM Generator 720.2 employs a recursive algorithm to list all parts and components in a multi-level hierarchical structure. The BOM Generator 720.2 can use GET requests via RESTful APIs to fetch real-time inventory data from the RTDM 710.

The Deal Registration Handler 720.3 connects to Customer Relationship Management (CRM) systems via APIs and logs the transaction. It also checks for account-based customizations or restrictions through SQL queries or similar database calls. The Deal Registration Handler 720.3 can use OAuth 2.0 for secure API calls to CRM systems.

Another sub-component, the Pricing Engine 720.4, calculates the overall cost estimate dynamically. It fetches the latest part prices from the RTDM 710 and adds any available discounts or special pricing conditions. A cost-estimation algorithm factors in volume discounts and contractual obligations.

An Error-Check Integrator 720.5 validates all user inputs and configuration choices using algorithms stored in the AAML 715. If it identifies errors, it flags them for review.

Similarly, the QTO Module 725 specializes in Quote to Order processes. It can be configured to automate actions like real-time pricing retrieval, discount application, and quote generation. When a user initiates a QTO action from the SPoG UI 705, this module within the AAML 715 takes over. After processing the user's request and obtaining necessary data from the Real-Time Data Mesh 710, it generates the quote. The completed quote can then be sent back for display on the SPoG UI 705. The QTO Module 725 supports JSON and XML data formats for quote generation and retrieval.

Similarly, the QTO Module 725 houses a Pricing Aggregator 725.1 that collects current pricing information from multiple sources through the RTDM 710.

Another sub-component, the Discount Calculator 725.2, applies account-specific or promotional discounts to the pricing data. It can use a weighted scoring algorithm to optimize the combination of applicable discounts.

The Quote Template Filler 725.3 populates predefined templates with relevant data such as product descriptions, terms and conditions, and final pricing. It can use a string replacement algorithm for this task. The string replacement algorithm used by Quote Template Filler 725.3 can be based on the KMP (Knuth-Morris-Pratt) algorithm for efficient text search.

Another sub-component, the Authorization Checker 725.4, verifies user permissions based on roles or account history. It checks against role-based access control policies stored in the AAML 715.

The Error-Check Integrator 725.5 in the QTO Module 725 also validates quote details using predefined rules stored in the AAML 715 and flags any inconsistencies.

Both modules can also integrate with the error-checking algorithms present in the AAML 715. These algorithms validate the output of each module for accuracy and consistency. If errors are detected, they can be flagged for automatic correction or manual review.

In an alternative embodiment, machine learning models could be separately incorporated into the CTO Module 720 and the QTO Module 725. These models would allow each module to refine and optimize its respective processes over time based on past transactions and evolving data patterns.

More specifically, in an alternative embodiment, machine learning models integrate with the Configuration to Order (CTO) Module 720 and the Quote to Order (QTO) Module 725. These models focus on refining and optimizing various processes within each module.

Within the CTO Module 720, a machine learning model designed for predictive analytics integrates with the Configuration Builder 720.1. This model utilizes historical data on customer configurations to recommend optimal customizations. Trained on a neural network algorithm, the model evaluates patterns of past transactions stored in the Real-Time Data Mesh 710 to present recommendations when a user selects a product for customization in the SPoG UI 705. The model constantly updates itself by learning from newly gathered data, ensuring the recommendations stay current. The neural network algorithm for predictive analytics in the CTO Module 720 can be implemented using a multi-layer perceptron model.

Another machine learning model pairs with the Bill of Materials (BOM) Generator 720.2. Utilizing clustering algorithms, this model identifies common patterns of components that usually appear together in a BOM. It utilizes this information to suggest an initial set of components when a new BOM is created, accelerating the configuration process and reducing user workload.

Within the Deal Registration Handler 720.3, a machine learning model employs Natural Language Processing (NLP) algorithms to parse customer interactions from CRM systems. It identifies keywords or patterns indicative of a high-value deal and flags it for immediate attention. By doing so, it enables more effective deal prioritization and resource allocation.

A machine learning model within the Pricing Engine 720.4 can use regression algorithms to predict future price changes for components. This model trains on a dataset including historical price data from the Real-Time Data Mesh 710 and external economic indicators. It provides alerts or suggestions if prices are expected to change, aiding in better budget planning.

Lastly, the Error-Check Integrator 720.5 incorporates an anomaly detection machine learning model to identify and flag unusual configurations that are likely to result in errors. This model can use unsupervised learning algorithms to detect outliers in the configurations, thus improving error prevention mechanisms.

Moving to the QTO Module 725, a machine learning model integrates with the Pricing Aggregator 725.1. The model employs reinforcement learning algorithms to determine optimal times for price data retrieval. By analyzing past pricing volatility, it schedules data fetch operations during periods of low volatility to capture the most stable prices. During stable market conditions, a reinforcement learning model in Pricing Aggregator 725.1 fetches pricing data.

The Discount Calculator 725.2 integrates a machine learning model that employs a decision tree algorithm to optimize discount applications. It takes into account variables such as customer history, product type, and seasonal factors to calculate the most profitable combination of discounts.

The Quote Template Filler 725.3 can use a machine learning model that utilizes text mining algorithms to auto-fill templates. It scans large sets of historical quotes to identify the most effective phrasing and includes this language in new quotes.

A role-based machine learning model in the Authorization Checker 725.4 predicts the likelihood of an authorization level change for a given user, based on historical data. This preemptive measure expedites approval processes for quotes by alerting administrators to upcoming changes.

Finally, the Error-Check Integrator 725.5 can use supervised learning algorithms to identify errors in quote generation based on past flagged errors. It improves over time by learning from new errors and the actions taken to correct them.

In another alternative embodiment, machine learning models can be integrated into the Advanced Analytics and Machine Learning (AAML) Module 715 to improve its rule-based algorithms. Unlike the models in the CTO and QTO modules, which focus on specific functionalities, these models aim to enhance overall automation.

One such model may be an ensemble learning model that combines inputs from multiple machine learning models in the CTO and QTO modules. This model employs weighted voting mechanisms to make final decisions based on the outputs of individual models, thus enhancing the reliability of the automated processes.

A reinforcement learning model in the AAML 715 is configured to optimize the overall flow of actions in CTO and QTO processes. By simulating various paths that an operation can take through the modules, it identifies the most efficient sequence of actions. The reinforcement learning model in the AAML 715 can use Monte Carlo Tree Search (MCTS) for simulating various operational paths.

An NLP-based model within AAML 715 extracts actionable insights from unstructured data, like customer reviews or service logs. These insights serve to refine the rule-based algorithms, highlighting areas where automation can be more effective or more responsive to customer needs.

A trend analysis model can use time-series analysis algorithms to predict future requirements for data storage, computation power, or other resources. By doing so, it enables proactive scaling of resources, enhancing the overall efficiency.

A fraud detection machine learning model adds an additional layer of security to both CTO and QTO processes. Trained on a dataset of known fraudulent and non-fraudulent activities, the model can use classification algorithms to flag suspicious transactions for review, thereby improving the integrity of the entire system.

These machine learning models continually update based on newly ingested data, allowing for ongoing optimization of CTO, QTO, and overall automation processes. This results in a system that not only automates tasks but also self-improves over time.

As defined above, CTO Module 720 and QTO Module 725 can operate within AAML 715 or can be external modules operatively connected thereto. They interact with the Real-Time Data Mesh 710 and the SPoG UI 705 to perform their specialized functions, contributing to the overall efficiency and accuracy of the system 700.

The SPoG UI 705 serves as the central hub for user interaction. Developed using web-based technologies such as HTML, CSS, and JavaScript, it can be accessible from a variety of devices, including desktops, laptops, tablets, and smartphones. It displays real-time data and operational status extracted from the Real-Time Data Mesh 710. Users can initiate various CTO and QTO processes directly from SPoG UI 705, such as generating a bill of materials or initiating a quote.

In the Real-Time Data Mesh 710, data aggregation, transformation, and dissemination occur. It incorporates data from Ingram Micro and Vendor platforms, as well as from third-party databases. Data types may include but are not limited to pricing, material specifications, and inventory levels. APIs and data connectors can be used to pull this data, which can then be standardized into a uniform format suitable for consumption by SPoG UI 705 and AAML 715. The Real-Time Data Mesh 710 employs AES-256 encryption for secure data storage and transmission.

In an alternative embodiment, the Real-Time Data Mesh 710 could be augmented or replaced by a distributed database system to achieve higher scalability and fault tolerance. This alternative system would still serve the same functional requirements of aggregating and standardizing data but would offer improved resilience and performance.

The AAML 715 functions as a critical automation layer. It contains intelligent rules and algorithms designed for specific CTO and QTO actions such as deal registration, applying pricing, and generating quotes. The AAML 715 takes input initiated by a user from the SPoG UI 705, processes this input based on the existing rules, and interacts with the Real-Time Data Mesh 710 to either fetch or update data.

For example, if a user decides to create a quote, the AAML 715 would automatically perform tasks such as pulling customer data, fetching real-time pricing information from the Real-Time Data Mesh 710, applying any relevant discounts, and generating the quote. Once the quote is prepared, it can be displayed back on the SPoG UI 705 for user review and subsequent action.

Error-checking algorithms can be implemented by AAML 715. They validate configurations, pricing, and authorizations for each CTO and QTO process. If inconsistencies are found, they can be flagged for either automatic correction or manual review by the user.

In another alternative embodiment, machine learning models could be integrated into the AAML 715 to enhance its rule-based algorithms. These models could learn from previous transactions to refine and optimize the automation process over time.

Additional features could include a reporting and analytics module integrated into the system 700. This module would leverage data from both the Real-Time Data Mesh 710 and the AAML 715 to generate insights into the efficiency and effectiveness of the CTO and QTO processes. Reports and dashboards could be created and displayed via the SPoG UI 705.

Another alternative option could involve voice-activated controls being integrated into the SPoG UI 705. This feature would allow users to execute commands or retrieve data using voice input, enhancing usability.

The system 700 can be compatible with multiple operating systems and can be designed for cloud-based architectures. Deployment options include on-premises installations or a Software as a Service (SaaS) model.

In summary, the system 700 serves to amalgamate data from multiple sources into a unified interface via the SPoG UI 705, automate various CTO and QTO tasks via the AAML 715, and maintain a real-time, standardized data repository via the Real-Time Data Mesh 710. This architecture enables efficient, accurate, and error-minimized CTO and QTO processes.

Figure 8:
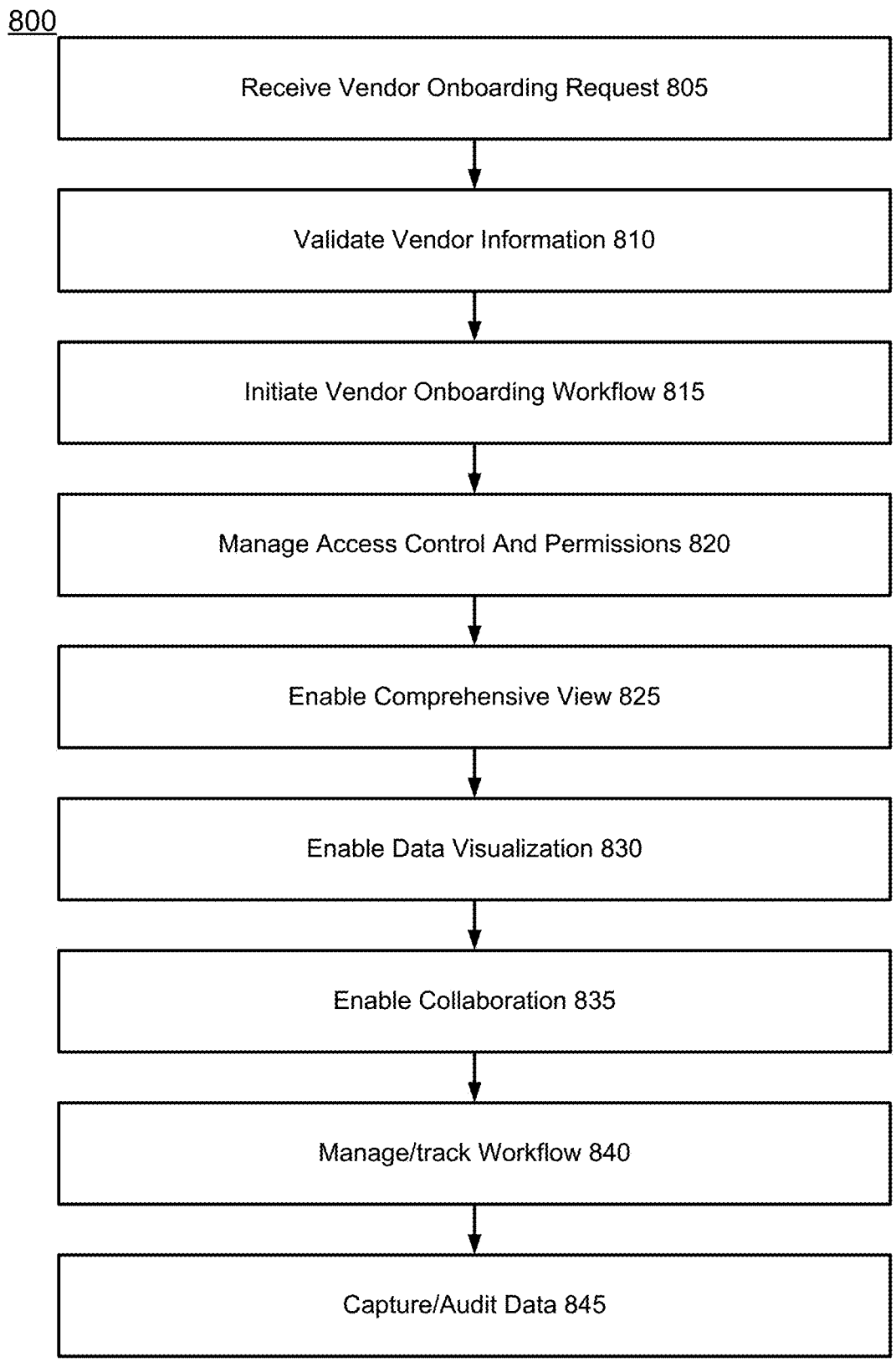
FIG. 8 is a flow diagram of a method for automating Configure to Order (CTO) and Quote to Order (QTO) processes, according to some embodiments of the present disclosure.

FIG. 8 is a flow diagram of a method 800 for automating Configure to Order (CTO) and Quote to Order (QTO) processes, according to some embodiments of the present disclosure. The flow details a series of operations from initiation to completion, with focus on both CTO Module 720 and QTO Module 725.

At Operation 801, the user initiates the process by accessing the Single Pane of Glass User Interface (SPoG UI) 705. User inputs can be collected here, which can range from product selection to configuration choices. SPoG UI 705 communicates with Advanced Analytics and Machine Learning (AAML) Module 715 to determine the required module, either CTO Module 720 or QTO Module 725, based on the input.

At Operation 802, the AAML Module 715 performs preliminary analytics to identify the user's needs. Algorithms within AAML 715 can be employed to route the user's request to the appropriate module, be it CTO 720 or QTO 725. During this stage, any user permissions can be verified against role-based access control policies stored in the AAML 715.

At Operation 803, the request can be forwarded to the Real-Time Data Mesh (RTDM) 710. The RTDM 710 fetches real-time inventory data or pricing information as needed. RESTful APIs can be commonly used to perform these data retrieval operations.

At Operation 804, the relevant module, either CTO Module 720 or QTO Module 725, processes the request. For CTO Module 720, sub-components like Configuration Builder 720.1 and Bill of Materials (BOM) Generator 720.2 activate. For example, Configuration Builder 720.1 uses a decision tree algorithm to guide the user through product customization, while the BOM Generator 720.2 employs a recursive algorithm to list components. On the other side, QTO Module 725 uses sub-components like Pricing Aggregator 725.1 and Discount Calculator 725.2. The Pricing Aggregator 725.1 fetches current pricing data from multiple sources through RTDM 710, and the Discount Calculator 725.2 applies discounts based on account-specific or promotional factors.

At Operation 805, a validation step occurs. Error-Check Integrator 720.5 in CTO Module 720 or Error-Check Integrator 725.5 in QTO Module 725 validates the user inputs and other variables. Algorithms stored in the AAML 715 can be used for this validation process.

At Operation 806, the processed data can be sent back to the SPoG UI 705 for user review. If the process involves configuration, the BOM and pricing details can be displayed. If it involves quoting, the finalized quote can be presented.

At Operation 807, machine learning models in either the CTO Module 720 or QTO Module 725 perform a post-process review. These models can utilize reinforcement learning, predictive analytics, or other algorithms to refine and optimize the process for future transactions.

At Operation 808, a logging mechanism within the CTO Module 720 or the QTO Module 725 records the transaction details for auditing or future analysis. This can include user selections, BOMs generated, or quotes produced.

At Operation 809, the user confirms or modifies the presented data on SPoG UI 705. Upon confirmation, the CTO or QTO process can be deemed complete.

This detailed operational flow integrates SPoG UI 705, RTDM 710, AAML 715, CTO Module 720, and QTO Module 725, each performing specific functions to automate and optimize the Configure to Order and Quote to Order processes. Alternative embodiments could include variations in machine learning algorithms or data retrieval methods, providing flexibility and scalability to system 700.

Figure 9:
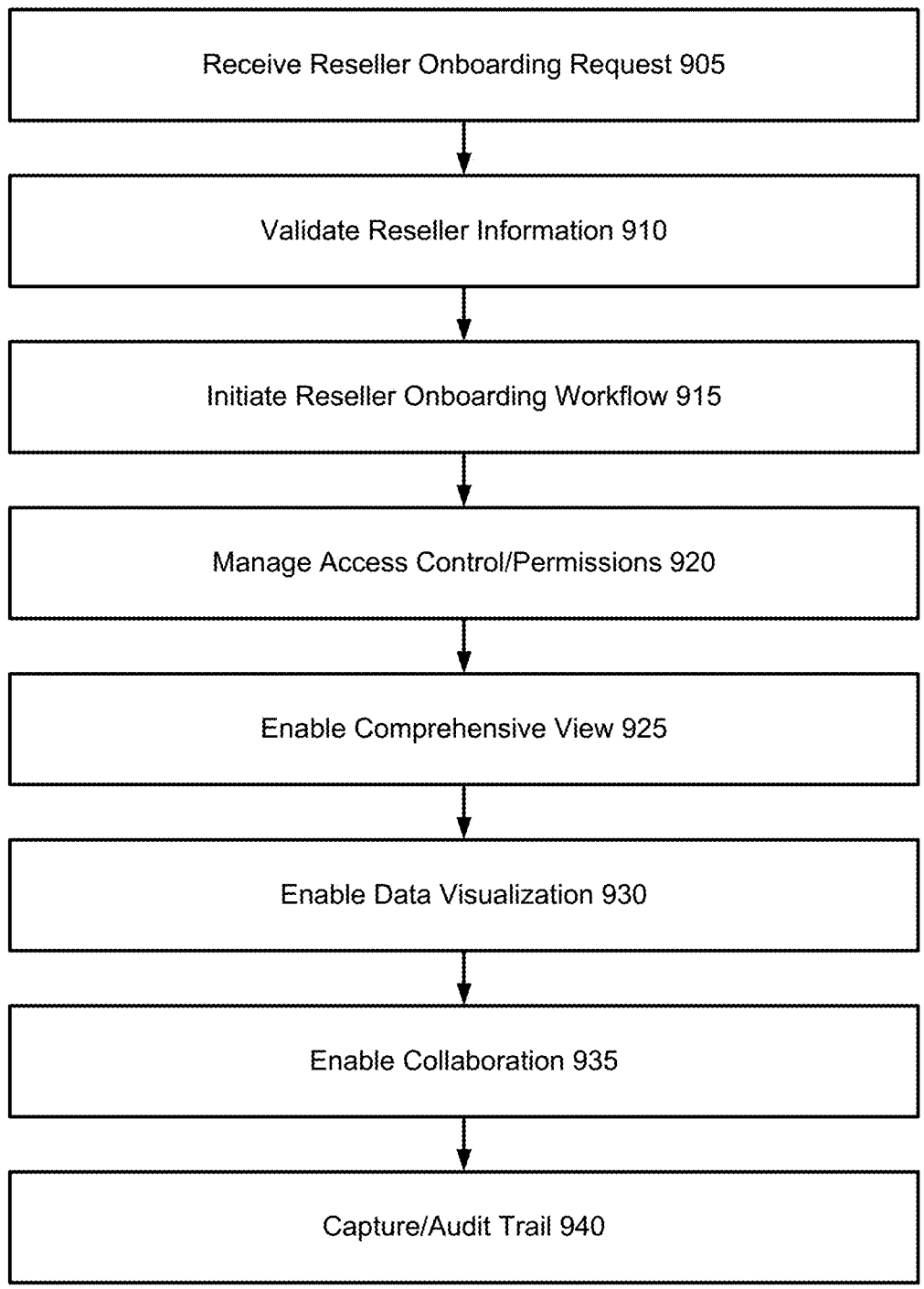
FIG. 9 is a flow diagram of for automating a Configuration to Order (CTO) process, according to some embodiments of the present disclosure.

FIG. 9 is a flow diagram of a method 900 for automating Configure to Order (CTO), according to some embodiments of the present disclosure. Method 900 describes a detailed process for executing CTO tasks in CTO Module 720. The method can be configured to interact closely with RTDM 710 and SPoG UI 705. It involves automating various CTO-related tasks such as bill of materials (BOM) generation, deal registration, and pricing.

At Operation 901, the CTO Module 720 receives a user-generated request from the SPoG UI 705 for configuring a product. The request can be initiated by a user interacting with the SPoG UI 705. SPoG UI 705 communicates with CTO Module 720 via an internal API or a direct module call. In some instances, the request can be routed through the Advanced Analytics and Machine Learning (AAML) Module 715 before reaching the CTO Module 720 for additional data analytics or security checks.

Operation 902 activates Configuration Builder 720.1 within the CTO Module 720. The Configuration Builder 720.1 fetches real-time inventory data and available customization options from the RTDM 710. This real-time data ensures that the inventory information presented to the user is current and accurate. A decision tree algorithm can be used to offer the user a set of compatible choices based on the user's initial request and the available inventory. The algorithm employs entropy minimization techniques to optimize the choices presented. In an alternative embodiment, machine learning models like neural networks refine the choices based on historical user behavior, offering a more tailored selection.

At Operation 903, the BOM Generator 720.2 uses a recursive algorithm to list all components in a hierarchical structure. Each parent component may have zero or more child components, and the algorithm traverses this tree structure to create a complete BOM. The algorithm could be a Depth-First Search (DFS) that starts at the root component and explores as far as possible before backtracking.

At Operation 905, the Pricing Engine 720.4 employs a cost-estimation algorithm that takes into account multiple variables, such as base price, volume discounts, and special pricing conditions. The algorithm could be a multi-variable linear regression model that predicts the total cost based on these variables. In an alternative embodiment, a more advanced machine learning model like Random Forest could be used for this purpose, which considers complex relationships between variables and provides a more dynamic pricing model. In addition to multiple variables, Pricing Engine 720.4 can incorporate real-time market data to adjust pricing dynamically. The real-time market data can be fetched via RTDM 710 and can influence factors such as base price and volume discounts.

In Operation 906, Error-Check Integrator 720.5 uses a set of validation algorithms. These algorithms could include basic checks, such as boundary conditions for numerical inputs, and more advanced checks like anomaly detection algorithms to identify abnormal behavior or configurations. Advanced algorithms could be support vector machines (SVM) trained to classify configurations as valid or invalid based on historical data. Regarding the interaction with CRM systems in Operations 904 and 907, CRM data can be fetched and integrated via the Real-Time Data Mesh (RTDM) 710. Alternatively or additionally, OAuth 2.0 secure API calls to the CRM can be made through the RTDM, ensuring that all CRM data is current. SQL queries pull account-specific data, such as customization restrictions or previously negotiated pricing conditions, directly from the CRM database via the RTDM. This ensures that all information used in the CTO process is synchronized and current. In this operation, Error-Check Integrator 720.5 also applies pre-set validation rules to ensure the generated automated quote meets predefined criteria, including but not limited to pricing limits and inventory availability.

In some embodiments Method 900 can include one or more Operations (not shown) for generating real-time reports related to the automated CTO process. These reports can cover aspects such as pricing variations, vendor selections, and validation results, and they can be accessed via SPoG UI 705. Also, Method 900 can include selection of a vendor system based on pre-set criteria such as delivery time, cost, and quality metrics, executed within the constraints of the existing operations. In some embodiments, a notification can be sent to one or more users through SPoG UI 705 upon successful execution to confirm that the CTO process is complete. A notification can be also or alternatively be sent to denote errors occurring during Method 900.

Though described sequentially, operations described herein can occur simultaneously or be reordered based on implementation needs. These operations can be further customized to meet specific user or organizational requirements. Additional modules or sub-modules can be integrated into the existing structure to expand the capabilities of Method 900.

Figure 10:
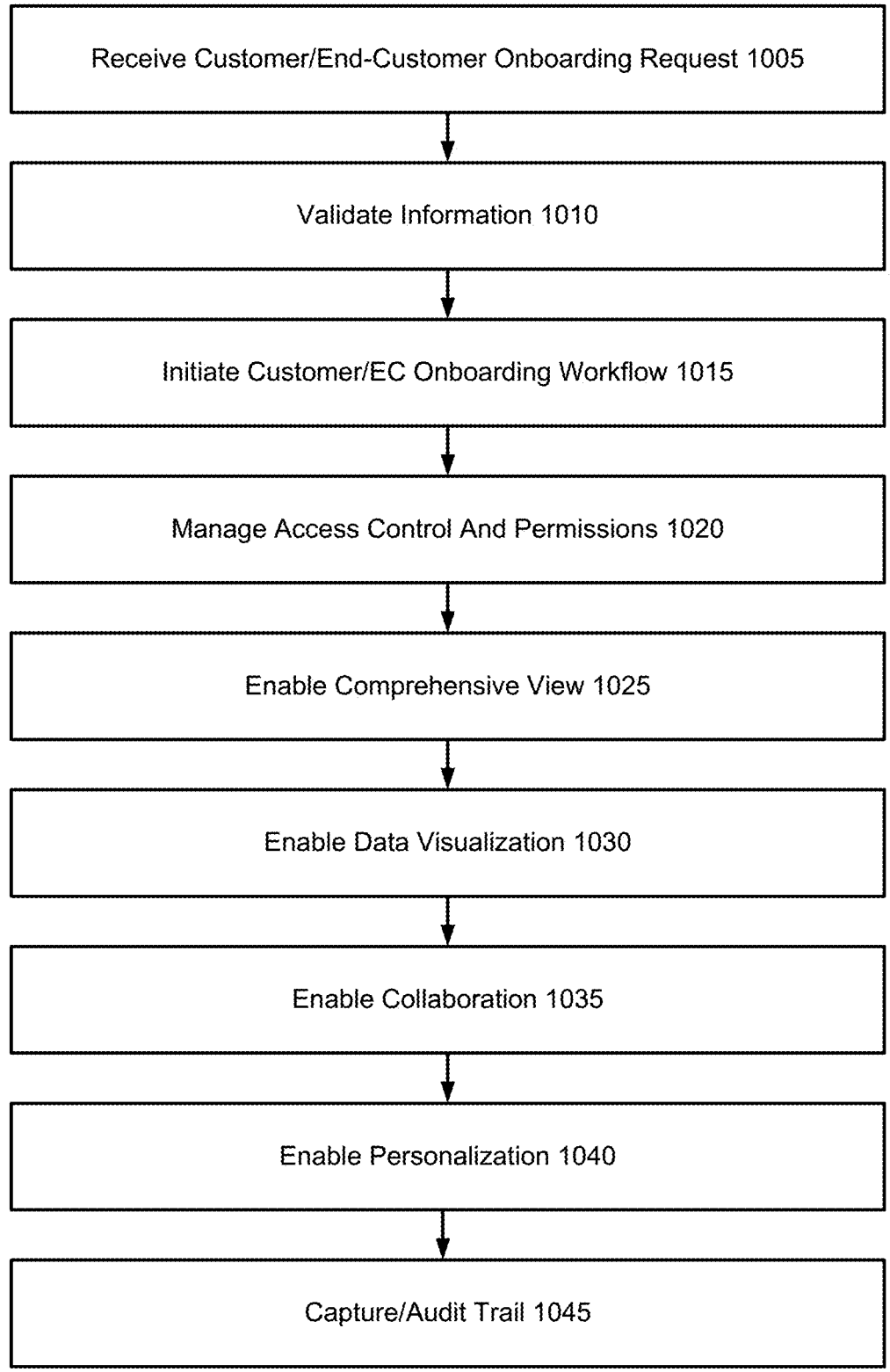
FIG. 10 is a flow diagram for automating a Quote to Order (QTO) process, according to some embodiments of the present disclosure.

FIG. 10 is a flow diagram of a method 1000 for automating a Quote to Order (QTO) operation within the QTO Module 725, part of system 700 designed for automating Configure to Order (CTO) and Quote to Order (QTO) processes. Method 1000 integrates with various components, including Real-Time Data Mesh 710, Single Pane of Glass User Interface 705, and Advanced Analytics and Machine-Learning Module 715, to automate and optimize QTO tasks like real-time pricing retrieval, discount application, and quote generation.

At Operation 1001, a user initiates a QTO request via the Single Pane of Glass User Interface (SPoG UI) 705. This user interface can be developed using HTML, CSS, and JavaScript, and it communicates with the QTO Module 725 within the Advanced Analytics and Machine-Learning (AAML) Module 715 to start the QTO process. The request may be triggered by a user action such as clicking a "Generate Quote" button on the interface.

At Operation 1002, the QTO Module 725 verifies user permissions through Authorization Checker 725.4. The Authorization Checker cross-references user roles or account history against role-based access control policies stored in AAML 715. If the user has the proper permissions, the process advances to the next operation; otherwise, an error message can be displayed, and the process halts.

At Operation 1003, Real-Time Data Mesh (RTDM) 710 can be queried to fetch current pricing data. This involves Pricing Aggregator 725.1 in QTO Module 725 making data retrieval requests to RTDM 710. The data may include component prices, inventory levels, or vendor-specific pricing. At Operation 1003, Real-Time Data Mesh (RTDM) 710 can be queried to fetch current pricing data based on real-time market data. In a non-limiting example, Real-Time Data Mesh (RTDM) 710 can be queried to fetch current pricing data from vendors selected based on pre-set criteria.

At Operation 1004, Discount Calculator 725.2 applies applicable discounts to the pricing data. It uses a weighted scoring algorithm to determine the most effective combination of account-specific or promotional discounts. The calculated prices can be stored temporarily for subsequent operations.

At Operation 1005, the Quote Template Filler 725.3 takes the calculated prices and other necessary data and populates a predefined quote template. The template includes product descriptions, terms and conditions, and final pricing. A string replacement algorithm based on the KMP algorithm can be employed for this task.

At Operation 1006, Error-Check Integrator 725.5 reviews the populated quote for any inconsistencies or errors. It applies predefined rules stored in the AAML Module 715 to validate each element of the quote. Any inconsistencies can be flagged for manual review or automatic correction. At Operation 1006, Error-Check Integrator 725.5 reviews the populated quote for any inconsistencies or errors. It applies predefined rules, specifically pre-set validation rules stored in the AAML Module 715, to validate each element of the quote.

At Operation 1007, the completed quote can be sent back to the SPoG UI 705 for display to the user. The quote can be presented in various formats, including JSON and XML, as supported by QTO Module 725. The user has the option to approve, edit, or reject the quote. At Operation 1007, the completed quote can be sent back to the SPoG UI 705 for display to the user, and a notification can be sent to the user upon successful execution of the quote.

At Operation 1008, the quote details can be logged for auditing and future analytics. This logging mechanism exists within QTO Module 725 and stores metadata, such as the quote creation time, applied discounts, and user identification. At Operation 1008, the quote details and real-time reports related to the automated QTO process can be logged for auditing and future analytics.

At Operation 1009, a feedback loop to the Advanced Analytics and Machine-Learning (AAML) Module 715 occurs. The AAML Module can use ensemble learning or reinforcement learning algorithms to analyze the quote's data and the steps taken to produce it. This analysis helps in the continual optimization of the QTO process. At Operation 1009, a feedback loop to the AAML Module 715 can occur within a time frame based on user-defined parameters for order execution.

In an alternative embodiment, machine learning models could be integrated within the QTO Module 725 to refine and optimize its specific operations. For example, a machine learning model can be paired with the Pricing Aggregator 725.1 to determine optimal times for pricing data retrieval based on past pricing volatility.

Method 1000 provides an automated and efficient way to handle Quote to Order processes. It integrates various modules and components, such as the QTO Module 725, Real-Time Data Mesh 710, and the Single Pane of Glass UI 705, to ensure a smooth, error-free, and optimized QTO operation.

Though described sequentially, operations described herein can occur simultaneously or be reordered based on implementation needs. These operations can be further customized to meet specific user or organizational requirements. Additional modules or sub-modules can be integrated into the existing structure to expand the capabilities of Method 1000.

Figure 11:
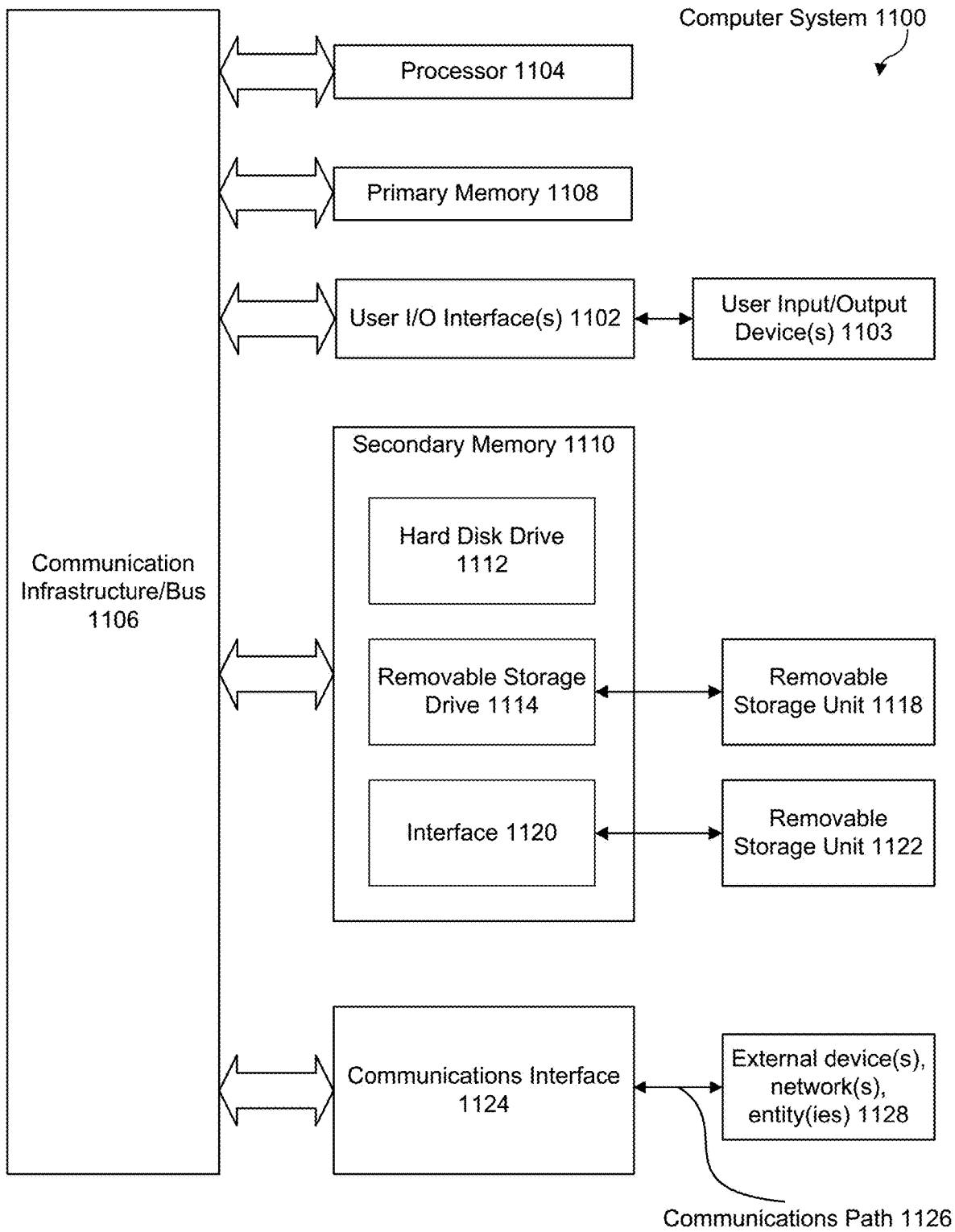
FIG. 11 is a block diagram of example components of device, according to some embodiments of the present disclosure.

FIG. 11ha block diagram of example components of device 1100. One or more computer systems 1100 may be used, for example, to implement any of the embodiments discussed herein, as well as combinations and sub-combinations thereof. Computer system 1100 may include one or more processors (also called central processing units, or CPUs), such as a processor 1104. Processor 1104 may be connected to a communication infrastructure or bus 1106.

Computer system 1100 may also include user input/output device(s) 1103, such as monitors, keyboards, pointing devices, etc., which may communicate with communication infrastructure 1106 through user input/output interface(s) 1102.

One or more processors 1104 may be a graphics processing unit (GPU). In an embodiment, a GPU may be a processor that can be a specialized electronic circuit configured to process mathematically intensive applications. The GPU may have a parallel structure that can be efficient for parallel processing of large blocks of data, such as mathematically intensive data common to computer graphics applications, images, videos, etc.

Computer system 1100 may also include a main or primary memory 1108, such as random access memory (RAM). Main memory 1108 may include one or more levels of cache. Main memory 1108 may have stored therein control logic (i.e., computer software) and/or data.

Computer system 1100 may also include one or more secondary storage devices or memory 1110. Secondary memory 1110 may include, for example, a hard disk drive 1112 and/or a removable storage device or drive 1114.

Removable storage drive 1114 may interact with a removable storage unit 1118. Removable storage unit 1118 may include a computer-usable or readable storage device having stored thereon computer software (control logic) and/or data. Removable storage unit 1118 may be program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 1114 may read from and/or write to removable storage unit 1118.

Secondary memory 1110 may include other means, devices, components, instrumentalities or other approaches for allowing computer programs and/or other instructions and/or data to be accessed by computer system 1100. Such means, devices, components, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 may enable computer system 1100 to communicate and interact with any combination of external devices, external networks, external entities, etc. (individually and collectively referenced by reference number 1128). For example, communication interface 1124 may allow computer system 1100 to communicate with external or remote devices 1128 over communications path 1126, which may be wired and/or wireless (or a combination thereof), and which may include any combination of LANs, WANs, the Internet, etc. Control logic and/or data may be transmitted to and from computer system 1100 via communication path 1126.

Computer system 1100 may also be any of a personal digital assistant (PDA), desktop workstation, laptop or notebook computer, netbook, tablet, smartphone, smartwatch or other wearables, appliance, part of the Internet-of-Things, and/or embedded system, to name a few non-limiting examples, or any combination thereof.

Computer system 1100 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1100 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100), may cause such data processing devices to operate as described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computerized method for automating configure-to-order (CTO) and quote-to-order (QTO) processes in an ERP-agnostic real-time data mesh environment, comprising:
    (a) monitoring, by a Real-Time Data Mesh (RTDM), a plurality of transactional systems, including at least one Enterprise Resource Planning (ERP) system, for real-time data changes, wherein the monitoring comprises capturing updates, modifications, or new transactions using at least one of log-based change tracking, trigger-based event detection, or periodic polling;
    (b) capturing and processing the detected data changes using a Change Data Capture (CDC) mechanism of the RTDM, wherein the CDC mechanism comprises:
        (i) a log-based change tracking process that captures transactional updates from system-generated logs without modifying primary data structures;
        (ii) a trigger-based event detection system that intercepts real-time data modifications at a source database level for immediate change recording; and
        (iii) a polling-based retrieval mechanism that periodically queries data sources to detect and process updates in environments where event-driven approaches are not feasible;
    (c) transforming, by the RTDM, the captured data into a standardized format, wherein the transformation comprises applying schema adaptation techniques, data normalization, and enrichment processes to maintain consistency across disparate data sources;
    (d) allocating, by the RTDM, the standardized data into a distributed storage framework, including dynamically provisioning a plurality of Purposive Datastores (PDSes) within a Global Data Lake, wherein each PDS is configured for optimized retrieval based on at least one of data classification, access frequency, or computational workload;
    (e) integrating, by the RTDM, the harmonized data into a federated data processing layer configured to enable parallel query execution across the plurality of PDSes;
    (f) executing, by a Configuration to Order (CTO) Module in communication with the RTDM and a Single Pane of Glass User Interface (SPoG UI), a configure-to-order process comprising:
        (i) querying the federated data processing layer of the RTDM to retrieve harmonized configuration data from the plurality of PDSes;
        (ii) generating a hierarchical bill of materials (BOM) based on the harmonized configuration data using a recursive Depth-First Search (DFS) algorithm based on user-selected product configuration parameters, each component of the BOM comprising metadata attributes extracted from the corresponding PDS;
        (iii) accessing a BOM database structure to retrieve component data corresponding to the desired product configuration;
        (iv) automatically initiating and storing a deal registration record for the specified product configuration in a deal registration handler, wherein the deal registration handler is in communication with customer relationship management (CRM) systems via one or more secure application programming interfaces (APIs) to retrieve and log customer-specific data, including account-based customizations and transaction metadata;
        (v) applying intelligent rule-based and machine learning algorithms to calculate optimized pricing and incentives; and
        (vi) transmitting the generated BOM and calculated pricing to the SPoG UI for real-time display and user confirmation.

2. The method of claim 1, further comprising validating the generated BOM and calculated pricing using pre-set validation rules to reduce potential errors.

3. The method of claim 1, wherein the intelligent rule-based and machine learning algorithms for calculating optimized pricing are based on real-time market data.

4. The method of claim 1, wherein the BOM database is updated dynamically based on real-time inventory and product lifecycle information retrieved from the federated data processing layer of the RTDM.

5. The method of claim 1, further comprising generating real-time reports related to the automated CTO process.

6. The method of claim 1, wherein the deal registration handler selects a vendor system based on pre-set criteria, including vendor reputation and delivery time.

7. The method of claim 1, further comprising sending a notification to the user via the SPoG UI upon successful confirmation of the generated BOM and pricing.

8. A system for automating Configure to Order (CTO) and Quote to Order (QTO) processes in an ERP-agnostic real-time data mesh environment, comprising:
record (a) a Real-Time Data Mesh (RTDM) configured to:
(i) monitor a plurality of transactional systems, including at least one Enterprise Resource Planning (ERP) system, for real-time data changes, wherein the monitoring comprises capturing updates, modifications, or new transactions using at least one of log-based change tracking, trigger-based event detection, or periodic polling;
(ii) capture and process detected data changes using a Change Data Capture (CDC) mechanism comprising:
(A) a log-based change tracking process that captures transactional updates from system-generated logs without modifying primary data structures;
(B) a trigger-based event detection system that intercepts real-time data modifications at a source database level for immediate change recording; and
(C) a polling-based retrieval mechanism that periodically queries data sources to detect and process updates in environments where event-driven approaches are not feasible;
(iii) transform the captured data into a standardized format by applying schema adaptation techniques, data normalization, and enrichment processes to maintain consistency across disparate data sources;
(iv) allocate the standardized data into a distributed storage framework, including dynamically provisioning a plurality of Purposive Datastores (PDSes) within a Global Data Lake, wherein each PDS is configured for optimized retrieval based on at least one of data classification, access frequency, or computational workload; and
(v) integrate the harmonized data into a federated data processing layer configured to enable parallel query execution across the plurality of PDSes;
(b) a Single Pane of Glass User Interface (SPoG UI) configured to enable user interaction and display real-time data;
(c) an Advanced Analytics and Machine Learning (AAML) Module configured to store and execute rule-based and machine learning algorithms;
(d) a Configuration to Order (CTO) Module communicatively coupled with the RTDM and the SPoG UI, the CTO Module comprising:
(i) a bill of materials (BOM) generator configured to use a recursive Depth-First Search (DFS) algorithm to generate a hierarchical BOM structure by querying the federated data processing layer of the RTDM to retrieve harmonized configuration data from one or more of the plurality of PDSes corresponding to a desired product configuration; and
(ii) executable instructions configured to:
(A) access a BOM database structure to retrieve component data corresponding to the desired product configuration, each component of the BOM comprising metadata attributes extracted from the corresponding PDS;
(B) automatically initiate and store a deal registration record for the specified product configuration in a deal registration handler, wherein the deal registration handler is in communication with customer relationship management (CRM) systems via one or more secure application programming interfaces (APIs) to retrieve and log customer-specific data, including account-based customizations and transaction metadata, thereby associating the deal registration record with customer and product data; and
(C) apply the rule-based and machine learning algorithms to calculate optimized pricing and incentives; and
(D) transmit the generated BOM and calculated pricing to the SPoG UI for real-time display and user confirmation.

9. The system of claim 8, wherein the CTO Module further comprises a logging mechanism to track all configuration changes for auditing purposes.

10. The system of claim 8, wherein the CTO Module integrates with the AAML Module for validation and error-checking purposes, using predefined rules stored in the AAML Module to flag inconsistencies and errors.

11. The system of claim 8, wherein the SPoG UI is accessible from a variety of devices, including desktops, laptops, tablets, and smartphones.

12. The system of claim 8, wherein the Real-Time Data Mesh is configured to standardize data into a uniform format suitable for consumption by the SPoG UI and other system modules.

13. The system of claim 8, further comprising machine learning models integrated into the CTO Module the models configured to optimize and refine configure-to-order processes over time based on past transactions and evolving data patterns.

* * * * *